(12) United States Patent
Cedola et al.

(10) Patent No.: US 12,116,860 B1
(45) Date of Patent: Oct. 15, 2024

(54) SYSTEMS AND METHODS FOR PRODUCING WELLBORE FLUIDS

(71) Applicant: EXERO WELL INTEGRITY, Denver, CO (US)

(72) Inventors: Alexandra Elizabeth Cedola, Edgewater, CO (US); Elizabeth Ann Sones, Morrison, CO (US); Matthew David Hudson, Lakewood, CO (US); Cheve Arlyn Meyer, Evergreen, CO (US)

(73) Assignee: EXERO WELL INTEGRITY, Denver, CO (US)

( * ) Notice: Subject to any disclaimer, the term of this patent is extended or adjusted under 35 U.S.C. 154(b) by 0 days.

(21) Appl. No.: 18/217,752

(22) Filed: Jul. 3, 2023

Related U.S. Application Data

(60) Provisional application No. 63/458,867, filed on Apr. 12, 2023.

(51) Int. Cl.
*E21B 33/14* (2006.01)
*C04B 18/04* (2006.01)
*C04B 28/00* (2006.01)
*C09K 8/40* (2006.01)
*C09K 8/46* (2006.01)
*E21B 21/06* (2006.01)

(52) U.S. Cl.
CPC ............ *E21B 33/14* (2013.01); *C04B 18/049* (2013.01); *C04B 28/006* (2013.01); *C09K 8/40* (2013.01); *C09K 8/46* (2013.01); *E21B 21/066* (2013.01)

(58) Field of Classification Search
CPC .. E21B 33/14; C09K 8/40; C09K 9/46; C09K 8/46

USPC .......................................................... 166/292
See application file for complete search history.

(56) References Cited

U.S. PATENT DOCUMENTS

| | | | | |
|---|---|---|---|---|
| 5,341,882 | A * | 8/1994 | Hale | E21B 21/066 166/292 |
| 6,981,560 | B2 * | 1/2006 | Nguyen | E21B 33/138 507/221 |
| 8,393,411 | B2 * | 3/2013 | Dupriest | E21B 21/082 507/140 |
| 10,717,913 | B2 * | 7/2020 | Agapiou | C09K 8/685 |
| 2014/0251614 | A1 | 9/2014 | Muthusamy et al. | |

(Continued)

OTHER PUBLICATIONS

Adjei, S., Elkatatny, S., Aggrey, W.N. & Abdelraouf, Y. 2021. Geopolymer as the future oil-well cement: A review. In Journal of Petroleum Science and Engineering 208(2022): 109485. https://doi.org/10.1016/j.petrol.2021.109485.

(Continued)

*Primary Examiner* — Zakiya W Bates
*Assistant Examiner* — Ashish K Varma
(74) *Attorney, Agent, or Firm* — Greenberg Traurig, LLP

(57) ABSTRACT

Systems, methods, and apparatus for producing wellbore fluids using drill cuttings, geopolymers, and/or mine tailings, and compositions relating to the same are disclosed. The drill cuttings, geopolymers, and/or mine tailings may be used to create appropriate wellbore fluids to be used in wellbore fluid supply systems, such as spacer fluids, lead barrier fluids, tail barrier fluids. In one embodiment, the wellbore fluids result in one or more substantially impermeable barrier sheaths within the wellbore, which barrier sheaths may be cementitious or non-cementitious.

30 Claims, 9 Drawing Sheets

(56) References Cited

U.S. PATENT DOCUMENTS

| | | |
|---|---|---|
| 2014/0261089 A1 | 9/2014 | Bisque et al. |
| 2016/0053542 A1* | 2/2016 | Stafford .................... E21B 7/00 175/69 |
| 2016/0194555 A1 | 7/2016 | Malachosky et al. |
| 2019/0390523 A1 | 12/2019 | Nguyen et al. |
| 2021/0207470 A1 | 7/2021 | Pisklak et al. |

OTHER PUBLICATIONS

Ahdaya, M. & Imqam, A. 2019. Investigating geopolymer cement performance in presence of water based drilling fluid. In Journal of Petroleum Science and Engineering, 176(2019): 934-942. https://doi.org/10.1016/j.petrol.2019.02.010.

Alkhamis, M. & Imqam, A. 2018. New Cement Formulations Utilizing Graphene Nano Platelets to Improve Cement Properties and Long-Term Reliability in Oil Wells. Presented at the SPE Kingdom of Saudi Arabia Annual Technical Symposium and Exhibition, Dammam, Saudi Arabia, 23-26 April. SPE-192342-MS. https://doi.org/10.2118/192342-MS.

Bois, A-P., Garnier, A., Galdiolo, G. & Laudet, J.B. 2012. Use of a Mechanistic Model to Forecast Cement-Sheath Integrity. In SPE Drilling & Completion 27(02): 303-314. https://doi.org/10.1016/j.petrol.2019.02.010.

Cantarel, V. & Yamagishi, I. 2021. Geopolymer and ordinary Portland cement interface analyzed by micro-Raman and SEM. In Journal of Nuclear Science and Technology 59(07): 888-897. https://doi.org/10.1080/00223131.2021.2016510.

Cedola, et al. "Cuttings Disposal in Cement: Investigation of the Effect on Mechanical Properties" ARMA 20-1677, American Rock Mechanics Association, 2020, pp. 1-8.

Cedola, et al. "Shale Cuttings Addition to Wellbore Cement and Their Effect on Unconfined Compressive Strength" Energies 2023, 16, 4727—MDPI Journal, pp. 1-24, https://doi.org/10.3390/en16124727.

Davidovits, Joseph, "Polymers and Geopolymers," Geopolymer, Chemistry & Applications, 5$^{th}$ edition, Chapters 1 and 2 (sections 1-15), pp. 1-382 (Mar. 2020). www.geopolymer.org.

Davidovits, Joseph, "Polymers and Geopolymers," Geopolymer, Chemistry & Applications, 5$^{th}$ edition, Chapter 3 (sections 17 and 18), pp. 407-442 (Mar. 2020). www.geopolymer.org.

Davidovits, Joseph, "Polymers and Geopolymers," Geopolymer, Chemistry & Applications, 5$^{th}$ edition, Chapter 4 (section 21), pp. 485-500 (Mar. 2020). www.geopolymer.org.

Davidovits, Joseph, "Polymers and Geopolymers," Geopolymer, Chemistry & Applications, 5$^{th}$ edition, Chapter 4 (sections 26 and 27), pp. 589-646 (Mar. 2020). www.geopolymer.org.

Gomado, F.D., Khalifeh, M., Kamali, M., Saasen, A. & Aasen, J.A. 2022. Sealing Performance of Geopolymer for Plugging and Abandonment; Apple-to-Apple Scenario. Presented at the SPE Norway Subsurface Conference, Bergen, Norway, Apr. 27. SPE-209552-MS.

Huang, et al. "A Review of Treatment Methods for Oil-Based Drill Cuttings" 2$^{nd}$ International Symposium on Resource Exploration and Environmental Science, IOP Publishing, IOP Conf. Series: Earth and Environmental Science 170 022074, (2018), pp. 1-8.

Igbojekwe, S., Salehi, S. & Khattak, M.J. 2015. Development of a New Geopolymer Based Cement: Laboratory Investigation. Presented at the 2015 AADE National Technical Conference and Exhibition, San Antonio, TX, 8-9 April. AADE-15-NTCE-07.

Kaze, R.C., Naghizadeh, A., Tchadjie, L., Adesina, A., Djobo, J.N.Y., Nemaleu, J.G.D., Kamseu, E., Melo, U.C. & Tayeh, B.A. 2022. Lateritic soils based geopolymer materials: A review. In Construction and Building Materials 344(2022): 128157. https://doi.org/10.1016/j.conbuildmat.2022.128157.

Kruszewski, M., Glissner, M., Hahn, S. & Wittig, V. 2020. Alkali-activated aluminosilicate sealing system for deep high-temperature well applications. In Geothermics 89(2021): 101935. https://doi.org/10.1016/.geothermics.2020.101935.

Matsimbe, et al., "Geopolymer: A Systematic Review of Methodologies," Materials 2022, 15, 6852 pp. 1-34. www.mdpi.com/journal/materials.

Mostavi, et al., "Feasibility Study of the Potential Use of Drill Cuttings in Concrete," Procedia Engineering 118, Science Direct: 1015-1023 (2015). www.sciencedirect.com.

Mustafa Al Bakri Abdullah, et al., "Reviews on the Different Sources Materials to the Geopolymer Performance," Advances in Environmental Biology: AENSI Journals, 7(12) October Special Issue (2013), pp. 3835-3842; www.aensiweb.com/aeb.html.

Nelson, Erik B, et al. "Implications of Cementing on Well Performance", Well Cementing (1990) Schlumberger Educational Services pp. 1.1-1.6.

Nelson, Erik B, et al. "Chemistry and Characterization of Portland Cement", Well Cementing (1990) Schlumberger Educational Services pp. 2.1-2.12.

Nelson, Erik B, et al. "Cement Additives and Mechanisms of Action", Well Cementing (1990) Schlumberger Educational Services pp. 3.1-3.32.

Nelson, Erik B, et al. "Mud Removal", Well Cementing—Chapter 5-5 Spacers and Washes Schlumberger Educational Services (1990) pp. 5.25-5.27.

Nelson, Erik B, et al. "Cement Job Design", Well Cementing (1990) Schlumberger Educational Services pp. 11.1-11.10.

Nelson, Erik B, et al. "Remedial Cementing", Well Cementing (1990) Schlumberger Educational Services pp. 13.1-13.27.

Nelson, Erik B et al. "Horizontal Well Cementing", Well Cementing—Chapter 15-5 Mud Removal/15-5.7 Preflushes and Space Fluids Schlumberger Educational Services (1990) pp. 15.13.

Nelson, Erik B. "Horizontal Well Cementing", Well Cementing—Chapter 15-6 Cement Slurry Properties (1990) Schlumberger Educational Services pp. 15.13-15.15.

Nodehi, M. & Taghvaee, V.M. 2021. Alkali-Activated Materials and Geopolymer: a Review of Common Precursors and Activators Addressing Circular Economy. In Circular Economy and Sustainability 2(2022): 165-196. https://doi.org/10.1007/s43615-021-00029-w.

Salehi, S., Khattak, M.J., Ali, N. & Rizvi, H.R. 2016. Development of Geopolymer-based Cement Slurries with Enhanced Thickening Time, Compressive, and Shear Bond Strength and Durability. Presented at the IADC/SPE Drilling Conference and Exhibition, Fort Worth, TX, Mar. 1-3. IADC/SPE-178793-MS.

Salehi, S., Khattak, J., Saleh, F.K. & Igbojekwe, S. 2019. Investigation and mix design and properties of geopolymers for application as wellbore cement. In Journal of Petroleum Science and Engineering 178(2019): 133-139. https://doi.org/10.1016/j.petrol.2019.03.031.

Thirumakal, P., Nasvi, M.C.M. & Sinthulan, K. 2020. Comparison of mechanical behaviour of geopolymer and OPC-based well cement cured in saline water. In SN Applied Sciences 2(2020): 1346. https://doi.org/10.1007/s42452-020-3154-9.

Yan, Y., Guan, Z., Yan, W. & Wang, H. 2020. Mechanical response and damage mechanism of cement sheath during perforation in oil and gas well. In Journal of Petroleum Science and Engineering 188(2020): 106924. https://doi.org/10.1016/1.petrol.2020.106924.

Zhao, X., Hwang, B-G. & Lim, J. 2019. Job Satisfaction of Project Managers in Green Construction Projects: Constituents, Barriers, and Improvement Strategies. In Journal of Cleaner Production 246(Feb. 10, 2020): 118968. http://doi.org/10.1016/j.clepro.2019.118968.

Gomado et al., (2023, March). Expandable Geopolymers for Improved Zonal Isolation and Plugging. In SPE/IADC Drilling Conference and Exhibition, 12 pp.

Jafariesfad et al., (2020). New materials and technologies for life-lasting cement sheath: A review of recent advances. SPE Drilling & Completion, 35(02), 262-278.

Kamali (2020, November). Materials for Well Integrity-Short-Term Mechanical Properties of Cement Systems. In SPE Norway Subsurface Conference, 13 pp.

Nasser et al., (2022). Microbially-Induced-Calcite-Precipitation (Micp): A biotechnological approach to enhance the durability of concrete using Bacillus pasteurii and Bacillus sphaericus. Heliyon, 8(7), 12 pp.

(56) References Cited

OTHER PUBLICATIONS

Palisch et al., (2021, September). A Novel Method to Detect Cement through Direct Measurement-Case Histories. In SPE Annual Technical Conference and Exhibition, 15 pp.

Phillips et al., (2018). Enhancing wellbore cement integrity with microbially induced calcite precipitation (Micp): A field scale demonstration. Journal of petroleum science and engineering, 171, 1141-1148.

Santos et al., (2018, October). Smart expandable polymer cement additive to improve zonal isolation. In SPE Eastern Regional Meeting, 9 pp.

Saputra et al., (2021). The influence of oil composition, rock mineralogy, aging time, and brine pre-soak on shale wettability. ACS omega, 7(1), 85-100.

Silva et al., (2023, June). Tracer-Based Monitoring of P&A in Offshore Fields. In SPE EuropEC-Europe Energy Conference featured at the 84th EAGE Annual Conference & Exhibition. OnePetro, 13 pp.

Taleghani et al., (2016, September). The use of temperature-triggered polymers to seal cement voids and fractures in wells. In SPE Annual Technical Conference and Exhibition, 15 pp.

Udebhulu et al., (2024). A review of cement sheath integrity evaluation techniques for carbon dioxide storage. Journal of Petroleum Exploration and Production Technology, 14(1), 1-23.

\* cited by examiner

SYSTEMS AND METHODS FOR PRODUCING WELLBORE FLUIDS

CROSS-REFERENCE TO RELATED APPLICATION

The present application claims priority to U.S. Provisional Application No. 63/458,867 entitled "SYSTEMS AND METHODS FOR PRODUCING WELLBORE FLUIDS," filed Apr. 12, 2023, which application is incorporated herein by reference in its entirety.

BACKGROUND

As explained in U.S. Patent Application Publication No. 2021/0253933A1, in cementing operations, such as well construction and remedial cementing, cement compositions are commonly utilized. Cement compositions may be used in primary cementing operations whereby pipe strings, such as casing and liners, are cemented in wellbores. In a typical primary cementing operation, a cement composition may be pumped into an annulus between the walls of the wellbore and the exterior surface of the pipe string, or casing, disposed therein. The cement composition may set in the annular space, thereby forming an annular sheath of hardened, substantially impermeable material (e.g., a cement sheath) that may support and position the pipe string in the wellbore and may bond the exterior surface of the pipe string to the wellbore walls. The cement sheath surrounding the pipe string generally functions to prevent the migration of fluids in the annulus, as well as protecting the pipe string from corrosion.

SUMMARY OF THE DISCLOSURE

Broadly, the present patent application relates to systems, methods, and apparatus for producing wellbore fluids using drill cuttings, geopolymers, and/or mine tailings, and compositions relating to the same. The drill cuttings, geopolymers, and/or mine tailings may be used to create appropriate wellbore fluids, such as spacer fluids, barrier fluids (e.g., fluids for producing barriers in a wellbore), and other useful wellbore fluids, as detailed herein.

As noted above, geopolymers may be used to create one or more wellbore fluids. In one approach, the geopolymers are synthesized from drill cuttings and/or mine tailings ("synthesized geopolymers"). The synthesized geopolymer materials may be used alone or in combination with drill cuttings and/or mine tailings to produce one or more wellbore fluids. The synthesized geopolymer materials may be produced, for instance, by reacting the drill cuttings and/or mine tailings with alkaline activators and/or other materials. In one embodiment, the synthesized geopolymers may be produced locally, e.g., where the drill cuttings and/or mine tailings are produced. In another embodiment, the synthesized geopolymers may be produced remotely, e.g., remote from where the drill cuttings and/or mine tailings are produced. In another approach, the geopolymers are sourced geopolymers, i.e., are geopolymers from sources other than drill cuttings and mine tailings. For instance, sourced geopolymers may be sourced from a suitable outside source (e.g., purchased) and/or produced from other materials, such as fly ash, slug, silica fume, and kaolin, among others. In one embodiment, sourced geopolymers are used in combination with drill cuttings, synthesized geopolymers and/or mine tailings to create one or more wellbore fluids.

One non-limiting embodiment of an exemplary method for creating and using a wellbore fluid is illustrated in FIG. 6. In the illustrated embodiment, the method comprises creating (1000) a wellbore fluid having drill cuttings and/or synthesized geopolymer. The method may optionally comprise pumping (2000) the wellbore fluid having the drill cuttings and/or synthesized geopolymer into a casing (e.g., to facilitate producing barriers in a wellbore).

The creating step (1000) may use any suitable drill cuttings. In one embodiment, the drill cuttings comprise dry drill cuttings, wet drill cuttings, and combinations thereof. In one embodiment, the creating step (1000) may include mixing (e.g., contacting) the drill cuttings with one or more liquids. In one embodiment, the liquid is an aqueous solution or an organic solution. In one embodiment, the liquid is an aqueous solution. In one embodiment, the aqueous solution is (or is based on) at least one of fresh water, ground water, deionized water, distilled water, produced water, and combinations thereof. In one embodiment, the aqueous solution is fresh water. In one embodiment, the aqueous solution is ground water. In one embodiment, the aqueous solution is produced water. In one embodiment, the aqueous solution is deionized water. In one embodiment, the aqueous solution is distilled water. In one embodiment, the creating step (1000) may include mixing the drill cuttings with one or more additives to create the wellbore fluid. The one or more additives may include, for example, an emulsifier, a viscosifier, a fluid loss control agent, a surfactant, a retarder, an accelerator, an extender, a densifier, an anti-shrinking agent, a resilient material, and combinations thereof. The created wellbore fluid may be any suitable wellbore fluid, such as any of a spacer fluid, a lead barrier fluid, and a tail barrier fluid. Additional details relating to the creation of wellbore fluids from drill cuttings are provided herein.

The drill cuttings may be obtained from any suitable source. In one embodiment, and referring now to FIG. 7, a method comprises drilling (800) a wellbore, thereby creating (810) at least some of the drill cuttings. The drill cuttings may be any suitable material or combinations of materials. In one embodiment, the drill cuttings comprise sedimentary materials, igneous materials, metamorphic materials, and combinations thereof. Non-limiting examples of suitable sedimentary materials for use as drill cuttings include dolomite, cherts, siltstone, chalk, shale, limestone, and sandstone, among others. Non-limiting examples of suitable igneous materials for use as drill cuttings include basalt, gabbro, and pumice, among others. Non-limiting examples of suitable metamorphic materials for use as drill cuttings include schist, argillite, and slate, among others. Once obtained, the drill cuttings may optionally be prepared (900) for the creating step (1000). For instance, the drill cuttings may be wholly or partially dried (910) and/or sized (920). In one embodiment, the drying step (910) comprises removing at least some drilling fluid and/or at least some drilling mud from the drill cuttings. In one embodiment, the sizing step (920) comprises comminuting the drill cuttings. In one embodiment, the comminuting comprises grinding the drill cuttings, pulverizing the drill cuttings, crushing the drill cuttings, and combinations thereof. Prior to, after, or in combination with the comminuting, the drill cuttings may be sorted (e.g., by size). In one embodiment, the sorting comprises sieving the drill cuttings, filtering the drill cuttings, and combinations thereof. In one embodiment, the wellbore fluid is created locally (e.g., where the drill cuttings are created). In another embodiment, the drill cuttings may be produced remotely prior to creating the wellbore fluid.

As noted above, a method may comprise mixing drill cuttings and/or geopolymers with a liquid to create a wellbore fluid. In one embodiment, and referring now to FIG. 8, a method comprises producing (1010) at least some synthesized geopolymer from at least some of the drill cuttings. The synthesized geopolymer may be used to create (1000) the wellbore fluid, and with or without the use of drill cuttings. In other embodiments, the synthesized geopolymer may be created from mine tailings, after which the synthesized geopolymer may be used to create (1000) the wellbore fluid, and with or without the use of drill cuttings. In yet other embodiments, sourced geopolymers may be used with drill cuttings to create one or more wellbore fluids.

Referring now to FIG. 9, in another embodiment a method may comprise creating (1001) a wellbore fluid having mine tailings. Here, mine tailings may be used (e.g., mixed) with any suitable liquid to create a wellbore fluid. In one embodiment, drill cuttings and/or geopolymer may be used (1030) with the mine tailings to create (1001) the wellbore fluid. Any suitable additives may be added to create the wellbore fluid. The wellbore fluid may be any suitable wellbore fluid, such as any of a spacer fluid, a lead barrier fluid, and a tail barrier fluid, among others. Additional details relating to the creation of wellbore fluids from mine tailings are provided herein.

DETAILED DESCRIPTION

Reference is now made to the accompanying figures, which illustrate various non-limiting, pertinent features of embodiments of the present disclosure.

i. System Overview

Figure 1:
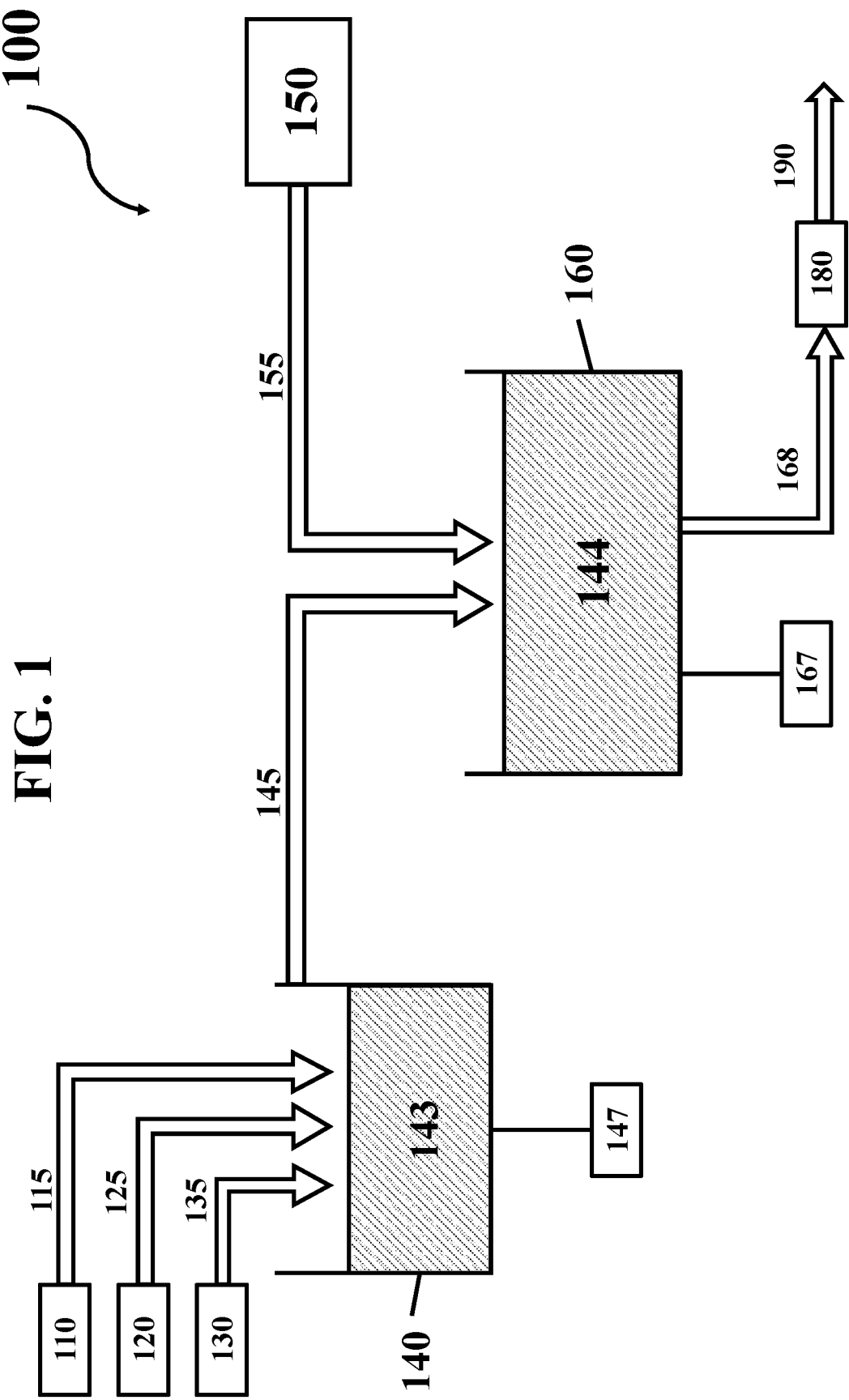
FIG. 1 is a block diagram illustrating one embodiment of a method for preparing a wellbore fluid in accordance with embodiments herein.

Referring now to FIG. 1, one embodiment of a wellbore fluid preparation system (100) is illustrated. In the illustrated embodiment, the wellbore fluid preparation system (100) may include a primary tank (110), a liquid tank (120), and a secondary tank (130). The primary tank (110) may contain drill cuttings, geopolymers, and/or mine tailings for producing one or more wellbore fluids. The primary tank (110), the liquid tank (120), and the secondary tank (130) may be fluidly connected to a primary mixing unit (140) via conduits (115, 125, 135). The primary mixing unit (140) may be fluidly connected to a secondary mixing unit (160) via a conduit (145). The secondary mixing unit (160) may be fluidly connected to a pump (180) (e.g., a slurry pump) via a conduit (168) for provision of wellbore fluids to a wellbore fluid supply system (200), such as that illustrated in FIG. 2. Optionally, the wellbore fluid preparation system (100) may include a supplement unit (150) to facilitate adjustment of a final wellbore fluid (144), as described in further detail below. As explained in detail below, the wellbore fluid preparation system (100) may be used to create and/or provide tailored wellbore fluids made from geopolymers, drill cuttings, and/or mine tailings to the wellbore fluid supply system (200).

Figure 2:
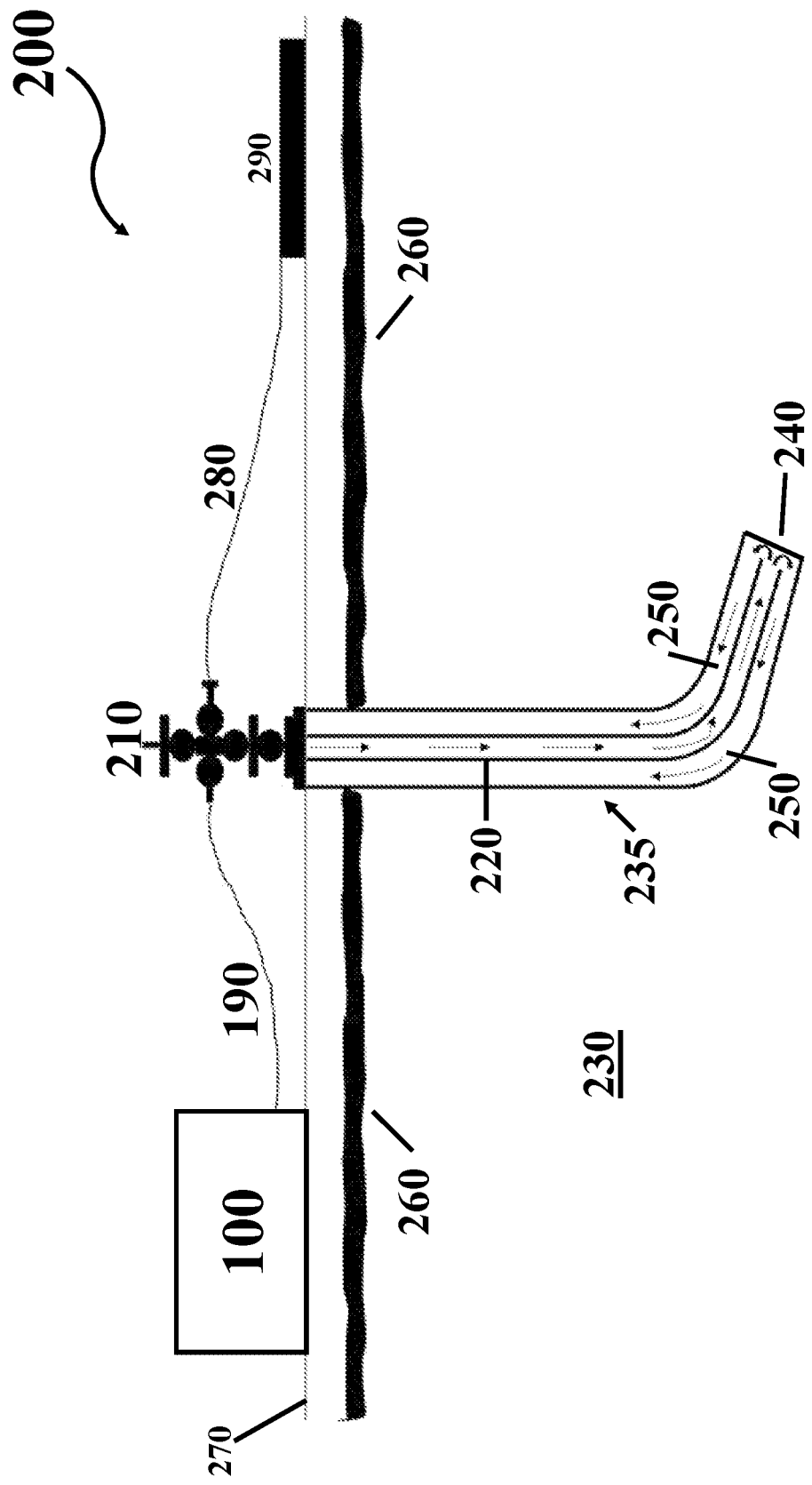
FIG. 2 is a schematic view of one embodiment of a wellbore fluid supply system for use with wellbore fluids in accordance with embodiments herein.

Referring now to FIG. 2, a wellbore fluid supply system (200) may include a wellbore head (210) fluidly connected to the wellbore fluid preparation system (100) via a conduit (190). The wellbore head (210) may be fluidly connected to a casing (220) for supply of wellbore fluids to the casing (220) and an annulus (250). The casing (220) extends through a borehole (235) located in a formation (230) and to a wellbore bottom (240). The casing (220) may have a smaller diameter than the borehole (235). The space between the casing (220) and the outer circumference of the borehole (235) creates the annulus (250). The wellbore head (210) is positioned at the surface (270), i.e., above the formation (230). As explained in detail below, the wellbore fluid supply system (200) may supply wellbore fluids from the wellbore fluid preparation system (100) to the borehole (235) for use in preparing and/or producing one or more barrier sheaths for a wellbore. A barrier sheath may result from the solidification (e.g., hardening, setting) of a wellbore fluid, such as the solidification of a lead barrier fluid or the solidification of a tail barrier fluid.

Figure 4:
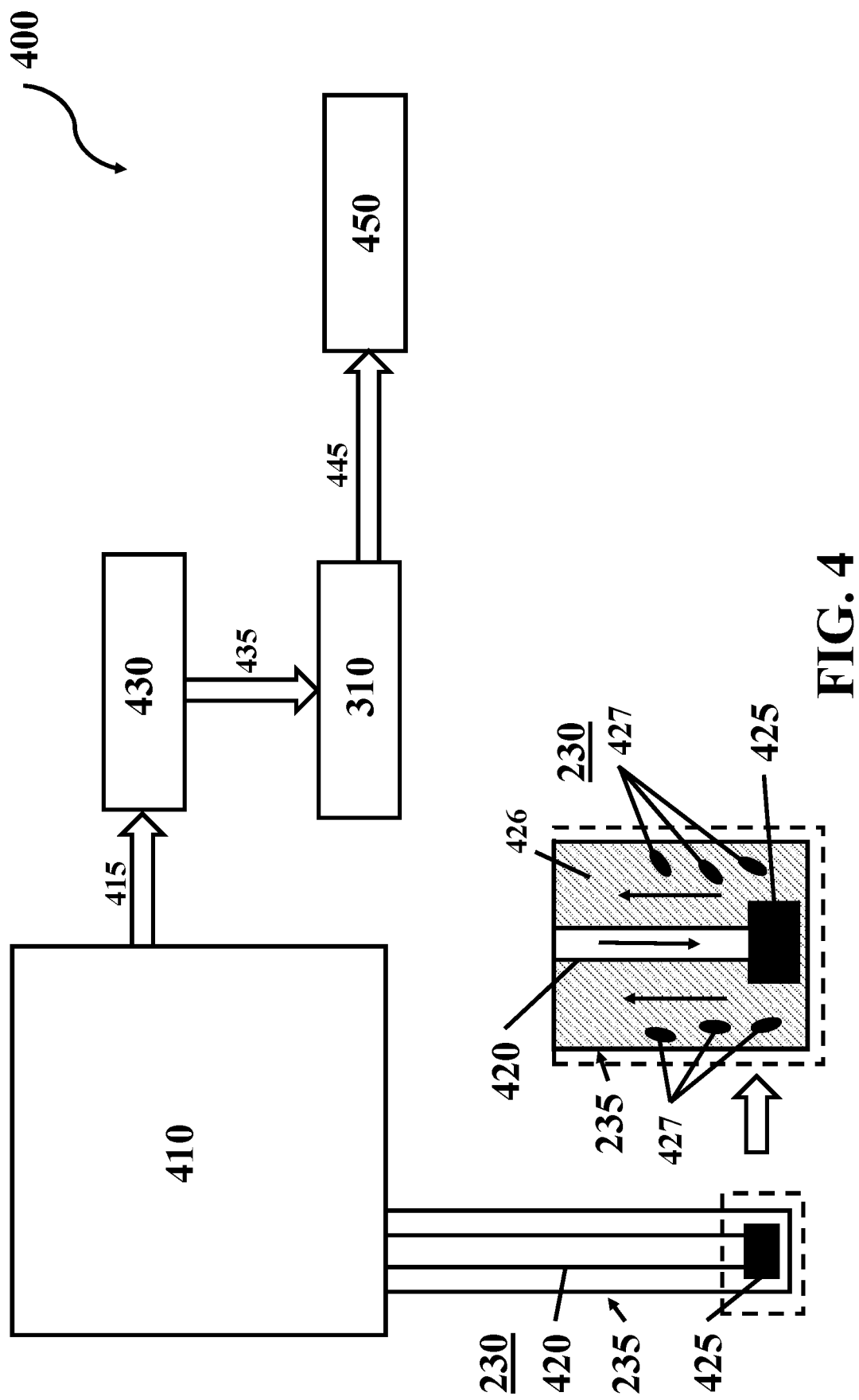
FIG. 4 is a schematic view of one embodiment of a wellbore drilling system in accordance with embodiments herein.

Referring now to FIG. 4, a wellbore drilling system (400) may be used to prepare a wellbore. In one embodiment, a wellbore drilling system (400) includes a drilling system (410), a primary treatment system (430), and a drill cuttings tank (310). The drilling system (410) may be fluidly connected to a drill string (420). A drill bit (425) may be attached to the end of the drill string (420). The drill bit (425) drills through the formation (230) to the wellbore bottom (240), creating the borehole (235) in the formation (230). A casing is then run through the borehole (235). The casing typically extends through the borehole (235) to the wellbore bottom (240), as shown in FIG. 2.

The drilling system (410) may be fluidly connected to the primary treatment system (430) via a conduit (415). The primary treatment system (430) may be fluidly connected to the drill cuttings tank (310) via a conduit (435). The primary treatment system (430) may recover drill cuttings (427) from the drilling fluids (426). Optionally, a secondary preparation unit (450) may be used to further process the drill cuttings (427). The recovered drill cuttings (427) may be used to produce synthesized geopolymers as detailed herein.

Figure 3:
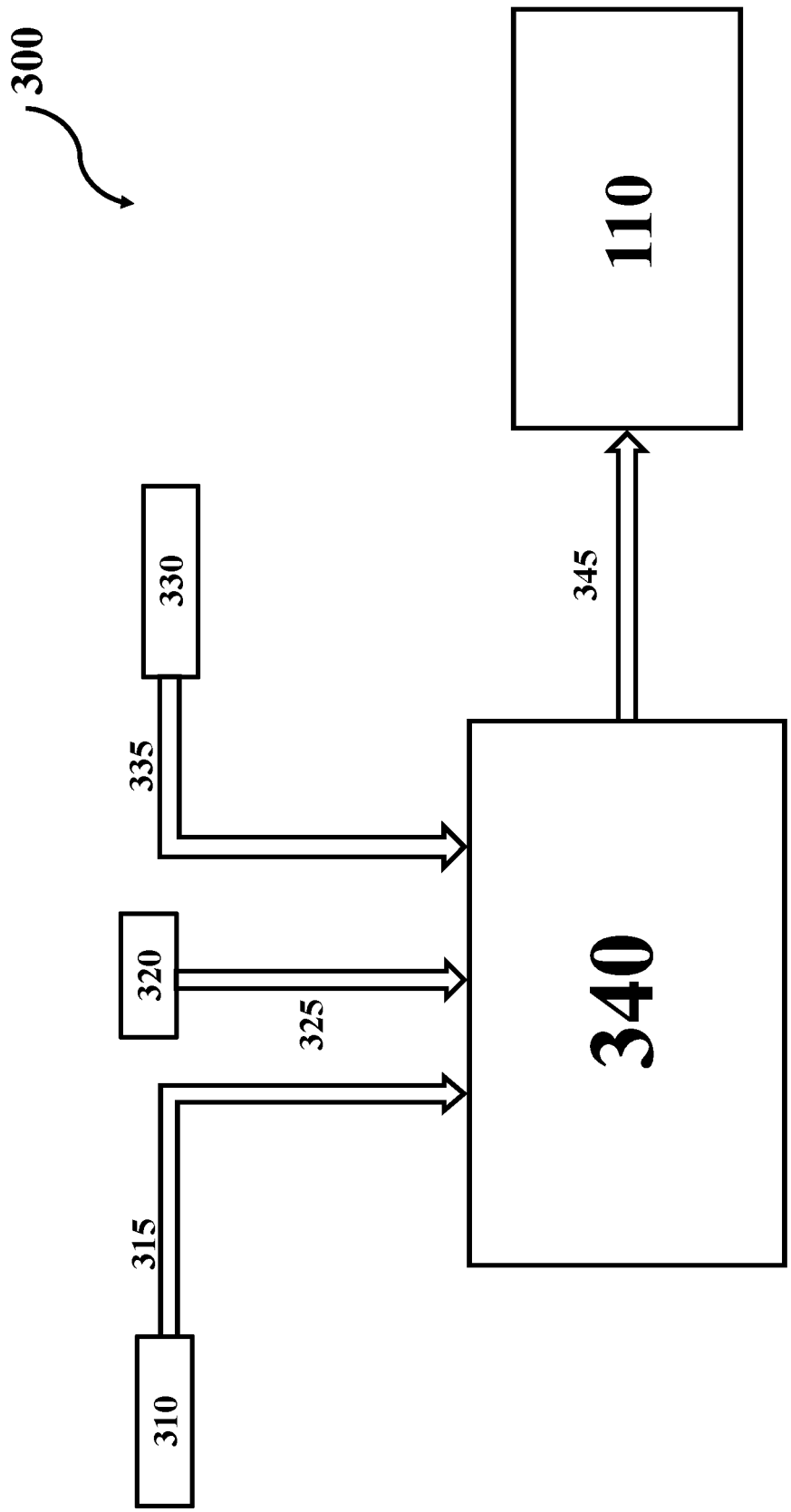
FIG. 3 is a block diagram of one embodiment of a geopolymer production system in accordance with embodiments herein.

Referring now to FIG. 3, in one embodiment, a geopolymer production system (300) may be used to produce one or more geopolymers. The geopolymer production system (300) may include a drill cuttings source (e.g., drill cuttings tank (310)), an alkaline activator source (320) (e.g., an alkaline activator tank), and/or a liquid source (330) (e.g., a liquid tank), which may be fluidly connected to a geopolymer production tank (340) via conduits (315, 325, 335). The drill cuttings and alkaline activator may be mixed (e.g., contacted) to produce one or more synthesized geopolymers as detailed herein. Liquid may be added as needed to facilitate the production. In one embodiment, the drill cuttings and one or more alkaline activators may react to produce the synthesized geopolymers. The geopolymer production tank (340) may be fluidly connected to the primary tank (110) (e.g., via conduit (345)). The primary tank (110) may be fluidly connected to the primary mixing unit (140), such as that illustrated in FIG. 1, for supply of the synthesized geopolymers to the wellbore fluid preparation system (100). Accordingly, the production of synthesized geopolymers from drill cuttings may be achieved locally. In other embodiments, synthesized geopolymer production from drill cuttings is conducted remotely.

Figure 5:
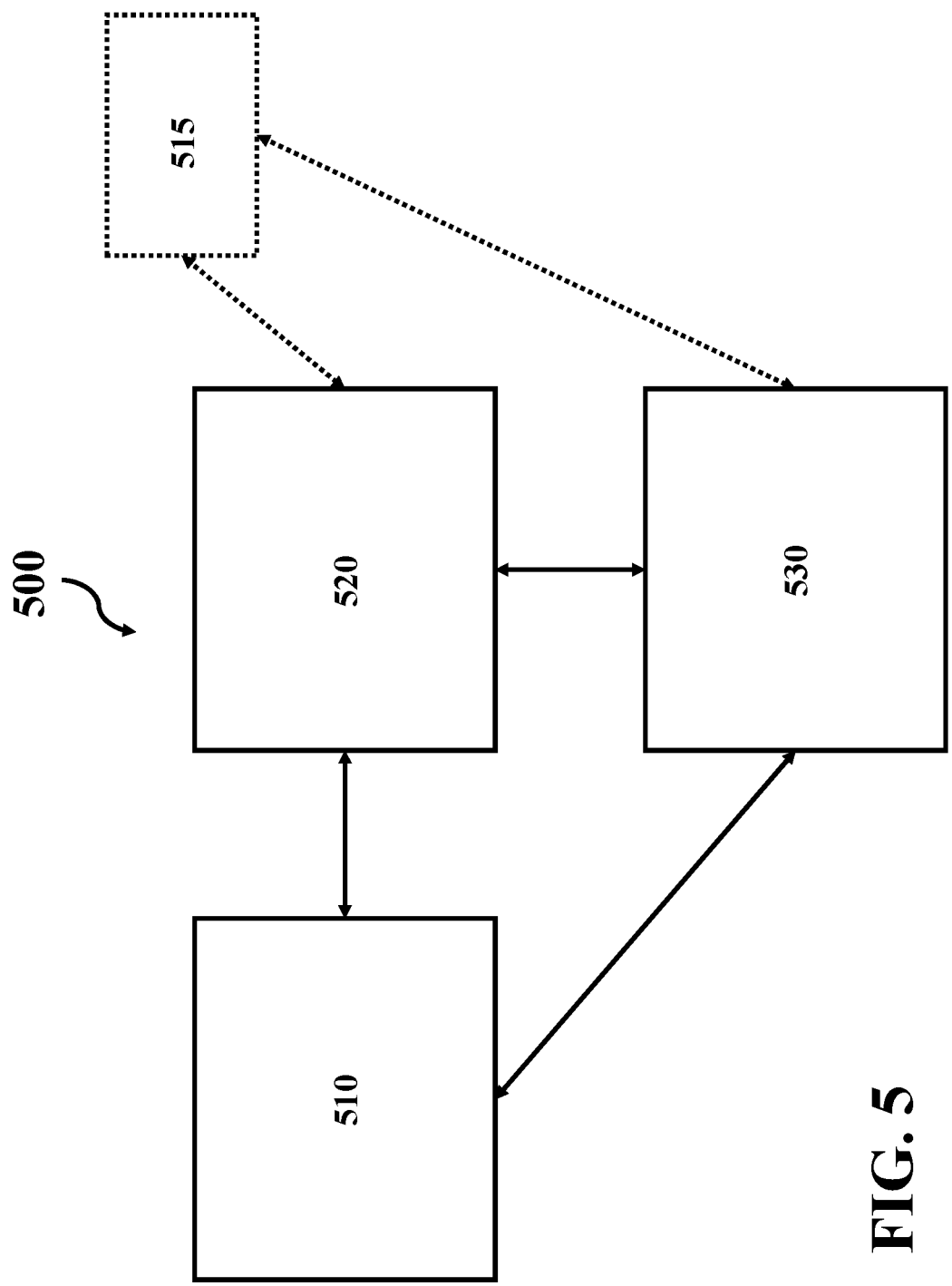
FIG. 5 is a block diagram illustrating one embodiment of an off-site preparation system in accordance with embodiments herein.
Figure 6:
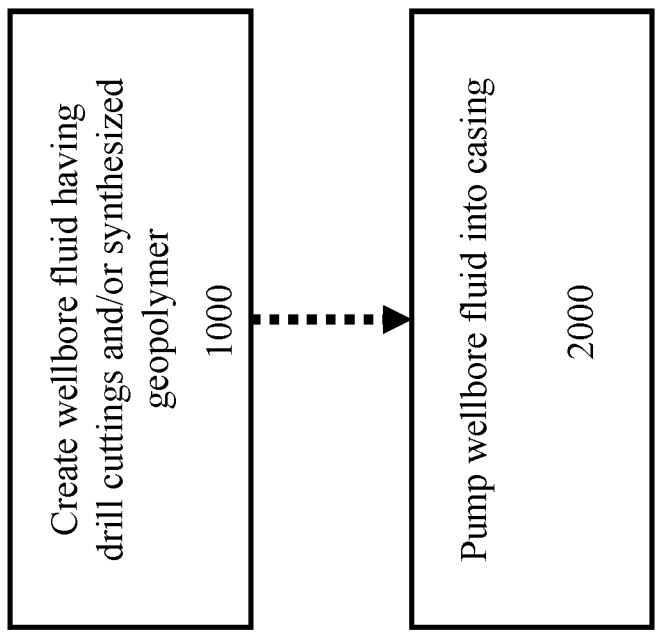
FIG. 6 illustrates one embodiment of a method for creating a wellbore fluid in accordance with embodiments described herein.
Figure 7:
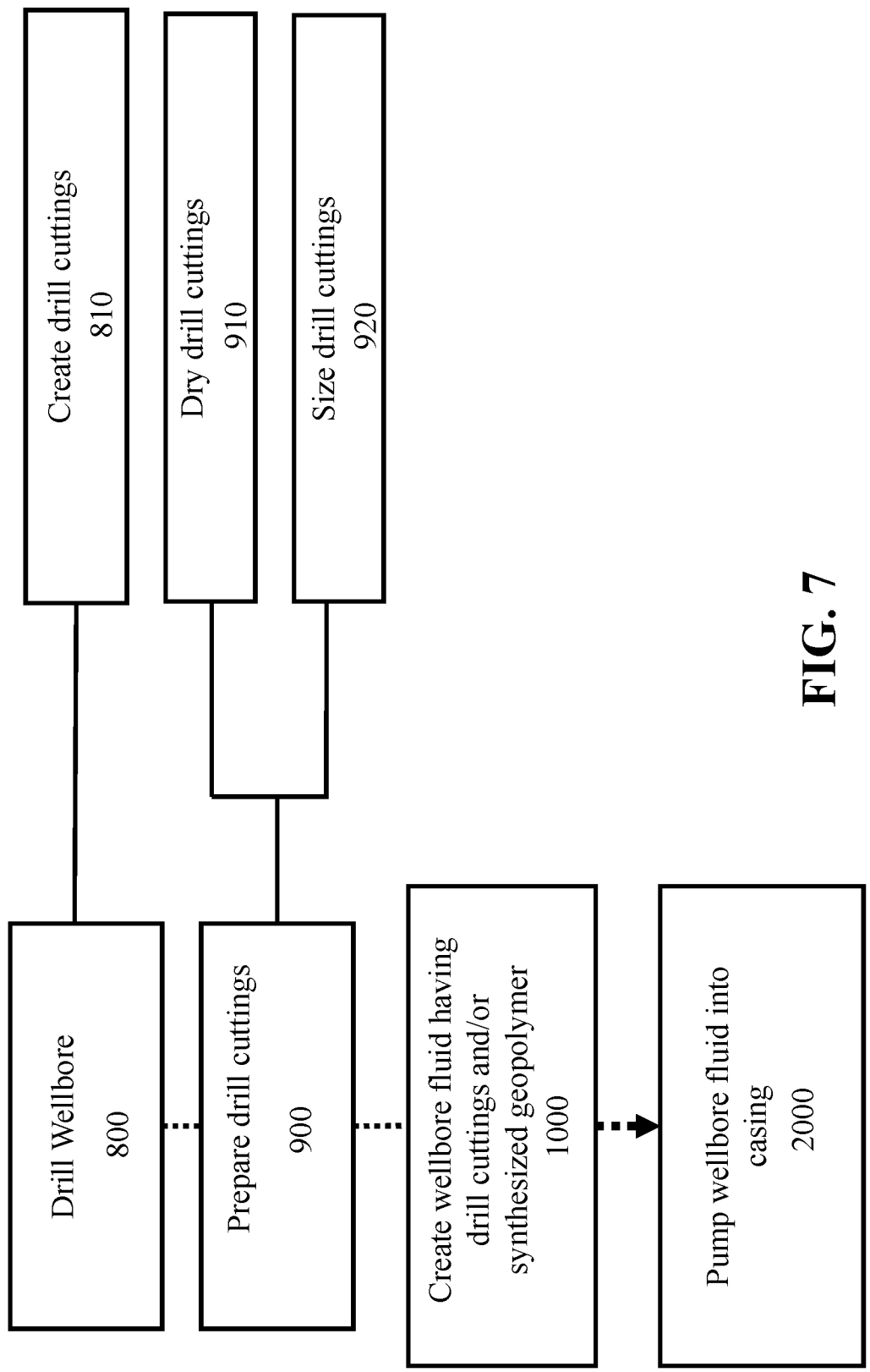
FIG. 7 illustrates one embodiment of a method for creating and/or preparing drill cuttings in accordance with embodiments described herein.
Figure 8:
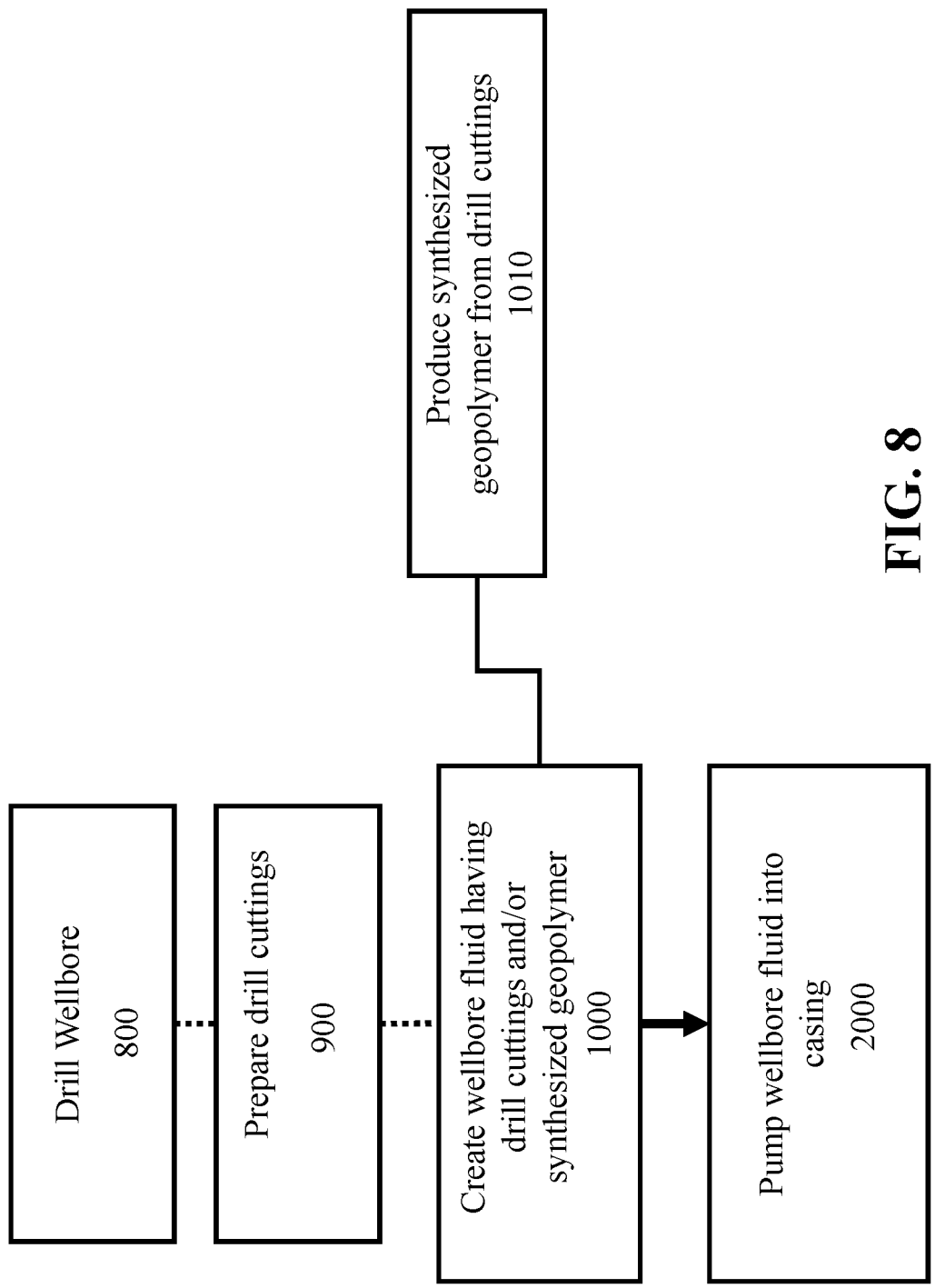
FIG. 8 illustrates one embodiment of a method for creating a wellbore fluid in accordance with embodiments described herein.
Figure 9:
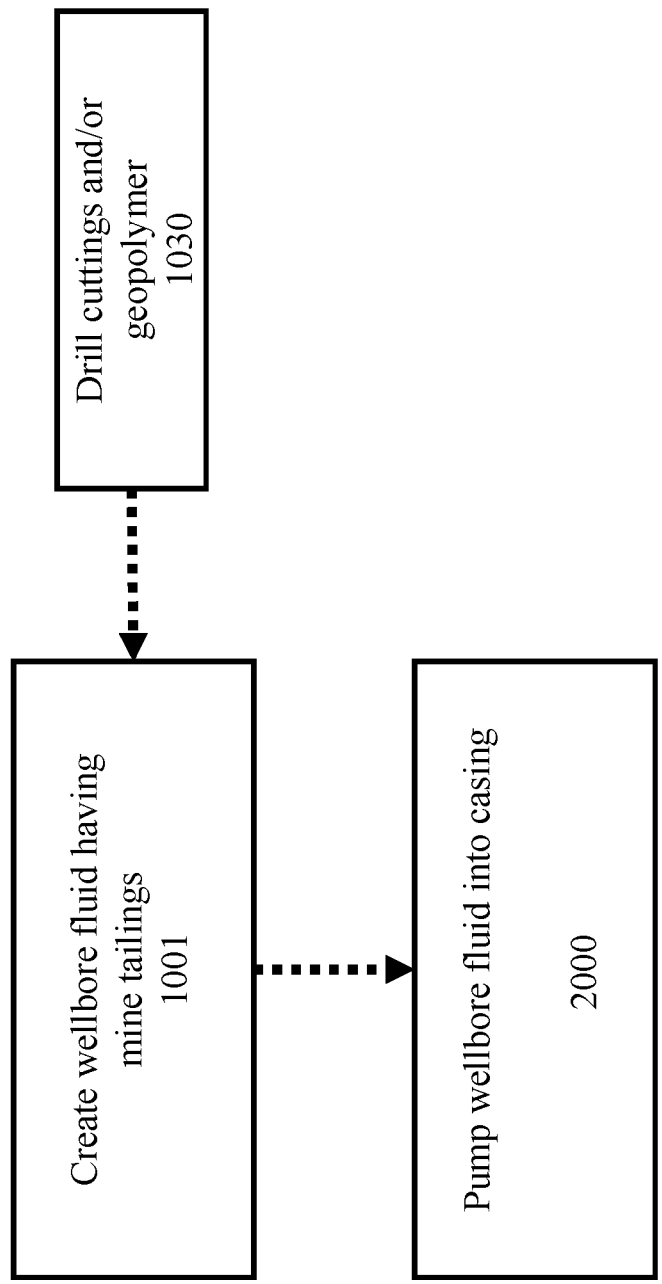
FIG. 9 illustrates another embodiment of a method for creating a wellbore fluid in accordance with embodiments described herein.

Referring now to FIG. 5, in one embodiment, drill cuttings (427) may be transported from a wellbore location (510) to an off-site preparation location (520). Drill cuttings (427) may then be treated at the off-site preparation location (520) to produce treated drill cuttings, as described in further detail below. In one embodiment, the treated drill cuttings may then be transported to the wellbore location (510). In another embodiment, the treated drill cuttings may then be transported to a secondary wellbore location (515). In yet another embodiment, the treated drill cuttings may then be used to produce synthesized geopolymers at the off-site preparation location (520), as described in further detail below.

With continued reference to FIG. 5, mine tailings may be used to produce synthesized geopolymers. In one embodiment, mine tailings from a mine tailing location (530) are transported to the wellbore location (510) for use in producing synthesized geopolymers. In another embodiment, mine tailings from the mine tailing location (530) may be transported to an off-site location, such as a secondary wellbore location (515), or the off-site preparation location (520) for use in producing synthesized geopolymers.

ii. Processing

With reference to FIG. 1, to produce one or more wellbore fluids, in one embodiment, drill cuttings, geopolymers, and/or mine tailings (i.e., primary materials) from the primary tank (110) may be transported through the conduit (115) to the primary mixing unit (140) (e.g., a primary mixing tank). Optionally secondary materials (e.g., cements, additives) from the secondary tank (130) may be transported through the conduit (135) to the primary mixing unit (140). Optionally, liquid (e.g., water) from the liquid tank (120) may be transported through the conduit (125) to the primary mixing unit (140). As needed, the drill cuttings, geopolymers, mine tailings, secondary materials, and/or liquid may be mixed (e.g., contacted) in the primary mixing unit (140) to create one or more wellbore fluids, such as a first wellbore fluid (143) as illustrated in FIG. 1. The amounts of drill cuttings, geopolymers mine tailings, secondary materials, and/or liquid supplied to the primary mixing unit (140) may be controlled (e.g., via valve(s) associated with the conduits (115, 125, 135) and/or associated with the tanks (110, 120, 130)) to achieve the desired amount of materials in the primary mixing unit (140). Accordingly, predetermined ratios of primary materials (drill cuttings, geopolymers, and/or mine tailings), secondary materials (e.g., cements, additives), and liquids (e.g., aqueous and/or organic solutions) may be achieved in the primary mixing unit (140) for preparation of appropriate wellbore fluid compositions, such as spacer fluid compositions, lead barrier fluid compositions, and/or tail barrier fluid compositions, among others. As may be appreciated, the term primary materials is used herein for ease of reference in relation to the use of drill cuttings, geopolymers, and/or mine tailings to produce wellbore fluids, and is not intended to imply or require that such materials make up a majority of any wellbore fluid composition. As may be appreciated, the term secondary materials is used herein for ease of reference in relation to secondary materials (e.g., cements, additives) that may be used in combination with the primary materials to produce wellbore fluids, and is not intended to imply or require that such materials make up a minority of any wellbore fluid composition.

After or concurrent to the mixing, one or more wellbore fluids (e.g., the first wellbore fluid (143)) may be transported to the secondary mixing unit (160) (e.g., a secondary mixing tank). In one embodiment, the transporting includes an overflow arrangement, wherein the one or more wellbore fluids exit a top or side of the primary mixing unit (140), after which the wellbore fluids flow into the secondary mixing unit (160). Other manners of transferring wellbore fluids from the primary mixing unit (140) to the secondary mixing unit (160) may be used (e.g., gravity flow, pumping).

In one embodiment, a density checker (147) (e.g., a density measurement and/or density verification apparatus) may be used to measure and/or check the density of the one or more wellbore fluids (e.g., the first wellbore fluid (143)) during and/or after its production in the primary mixing unit (140). In one embodiment, the density of the one or more wellbore fluids may be adjusted by changing the amount of primary materials, secondary materials, and/or liquid supplied to the primary mixing unit (140). Accordingly, the ratio of primary materials-to-secondary materials-to-liquid (PM:SM:L ratio) in the primary mixing unit (140) may be adjusted. In one embodiment, the density of the one or more wellbore fluids in the primary mixing unit (140) is adjusted by providing relatively more or less primary materials (drill cuttings, geopolymers, and/or mine tailings) from the primary tank (110) to the primary mixing unit (140), as needed. In another embodiment, the density of the one or more wellbore fluids in the primary mixing unit (140) is adjusted by providing relatively more or less liquid from the liquid tank (120) to the primary mixing unit (140), as needed. In yet another embodiment, the density of the one or more wellbore fluids in the primary mixing unit (140) is adjusted by providing relatively more or less secondary materials from the secondary tank (130) to the primary mixing unit (140), as needed. Accordingly, one or more wellbore fluids having one or more predetermined densities and/or one or more predetermined ratios of primary materials-to-secondary materials-to-liquid (PM:SM:L ratio) may be realized.

After a wellbore fluid is transported to the secondary mixing unit (160), it may be further mixed to create a final wellbore fluid (144). Optionally, adjustment material from the supplement unit (150) (e.g., a supplement tank) may be added (e.g., via conduit (155)), to the secondary mixing unit (160) to adjust one or more properties of the one or more wellbore fluids (e.g., the final wellbore fluid (144)). The adjustment material in the supplement unit (150) may be any suitable material including, for instance, primary materials, secondary materials, and liquid(s), among others. After or concurrent to the mixing of the one or more wellbore fluids, the one or more wellbore fluids are transported to a wellbore head (e.g., the wellbore head (210) of FIG. 2) for use in wellbore fluid supply operations.

Similar to the primary mixing unit (140), a density checker (167) may be used to check the density of the one or more wellbore fluids (e.g., the final wellbore fluid (144)) during and/or after their production in the secondary mixing unit (160). In one embodiment, the density of the one or more wellbore fluids may be adjusted by changing the amount of primary materials, secondary materials, and/or liquid supplied to the secondary mixing unit (160). Accordingly, the ratio of primary materials-to-secondary materials-to-liquid (PM:SM:L ratio) in the secondary mixing unit (160) may be adjusted. In one embodiment, the density of the one or more wellbore fluids in the secondary mixing unit (160) may be adjusted by providing relatively more or less adjustment material from the supplement unit (150) to the secondary mixing unit (160), as needed. In yet another embodiment, the density of the one or more wellbore fluids in the secondary mixing unit (160) may be adjusted by providing relatively more or less wellbore fluid (e.g., the first wellbore fluid (143)) of relatively higher or lower density from the primary mixing unit (140) to the secondary mixing unit (160), as needed. Accordingly, one or more wellbore fluids having one or more predetermined densities and/or one or more predetermined ratios of primary materials-to-secondary materials-to-liquid (PM:SM:L ratio) may be realized.

Now with reference to FIG. 2, one or more wellbore fluids (e.g., the final wellbore fluid (144)) may be supplied from the wellbore fluid preparation system (100) to the wellbore fluid supply system (200). In one embodiment, the one or more wellbore fluids are pumped through the casing (220) to the wellbore bottom (240), after which the one or more wellbore fluids enter the annulus (250). As additional wellbore fluid is supplied, the one or more wellbore fluids may travel upwards through the annulus (250) towards the surface (270). Multiple wellbore fluids may be pumped down the casing (220) and displaced up the annulus (250). After the one or more wellbore fluids have been supplied, the wellbore fluids may set (harden) in the annulus (250) to create a substantially impermeable barrier sheath (not illustrated) between the formation (230) and the casing (220). Some examples of suitable wellbore fluids, their methods of production, their compositions, and their provision to the wellbore are described below.

Referring back to FIG. 1, as noted above, the primary tank (110) may be used to supply drill cuttings, geopolymers, and/or mine tailings (i.e., primary materials) to facilitate production of wellbore fluids. Although not illustrated, any number of primary tanks (110) may be used to facilitate provision of materials for creation of wellbore fluids. In one embodiment, the primary tank (110) may contain one or more drill cuttings. Any suitable drill cuttings may be used to facilitate the production of wellbore fluids. In one embodiment, the drill cuttings comprise sedimentary materials, igneous materials, metamorphic materials, and combinations thereof. In one embodiment, the drill cuttings comprise sedimentary materials. In one embodiment, sedimentary materials may include dolomite, cherts, siltstone, chalk, shale, limestone, and sandstone, among others. In one embodiment, the drill cuttings comprise igneous materials. In one embodiment, igneous materials may include basalt, gabbro, and pumice, among others. In one embodiment, the drill cuttings comprise metamorphic materials. In one embodiment, metamorphic materials may include schist, argillite, and slate, among others. In one embodiment, the drill cuttings comprise shale. In another embodiment the drill cuttings comprise limestone. In another embodiment the drill cuttings comprise sandstone.

Similarly, in one embodiment, the primary tank (110) may contain one or more geopolymers. Any suitable geopolymer may be used to facilitate production of wellbore fluids (e.g., synthesized geopolymers, sourced geopolymers, and combinations thereof). In one embodiment, the geopolymer in the primary tank (110) may include synthesized geopolymer. In another embodiment, the geopolymer in the primary tank (110) may include sourced geopolymer. Suitable sourced geopolymers may include geopolymers purchased from vendors and/or geopolymers produced from fly ash, slag, silica fume, and kaolin, among other materials. In one embodiment, the geopolymer in the primary tank (110) may include geopolymer produced on-site (e.g., as a result of obtaining drill cuttings from a well drilling operation). In another embodiment, the geopolymer in the primary tank (110) may include geopolymer produced off-site.

Similarly, in one embodiment, the primary tank (110) may contain one or more mine tailings. Any suitable mine tailings may be used to facilitate the production of wellbore fluids. Mine tailings may include any suitable waste from a mining operation. In one embodiment, the mine tailings in the primary tank (110) may include mine tailings from mineral mines (e.g., gypsum, limestone, diatomite, dolomite, barite, silica, pumice, talc, bentonite, kaolin, trona). In another embodiment, the mine tailings in the primary tank (110) may include mine tailings from ore mines (e.g., iron, aluminum, platinum, palladium, titanium, tungsten, lead, copper, zinc, molybdenum, gold, silver, nickel). In another embodiment, the mine tailings in the primary tank (110) may include mine tailings from gem mines (e.g., garnet, sapphire, turquoise, diamond, ruby, opal, emerald).

In one embodiment, mine tailings may be prepared prior to use in creating a wellbore fluid and/or prior to conversion to a synthesized geopolymer. In one embodiment, preparing the mine tailings may include separating the mine tailings, drying the mine tailings, sizing the mine tailings, and combinations thereof. Separating the mine tailings may include removing unusable waste from the mine tailings. Suitable methods of separating the mine tailings include froth flotation, pyrometallurgical froth flocculation, hydrometallurgical froth flocculation, biochemical metallurgical processing (e.g., bioleaching, bioreduction, biosorption, biomining), and combinations thereof. In one embodiment, drying the mine tailings may include removing fluid from the mine tailings. In one embodiment, sizing the mine tailings may include sorting mine tailings, comminuting mine tailings, and combinations thereof. Sorting the mine tailings may include sieving the mine tailings, filtering the mine tailings, and combinations thereof. Comminuting the mine tailings may include grinding the mine tailings, pulverizing the mine tailings, crushing the mine tailings, and combinations thereof.

Referring back to FIG. 1, as noted above, the liquid tank (120) may be used to supply one or more liquids to facilitate production of wellbore fluids. Although not illustrated, any number of liquid tanks (120) may be used to facilitate provision of materials for creation of wellbore fluids. Further, any suitable liquids may be used to facilitate production of wellbore fluids, including aqueous and/or organic liquids. In one embodiment, the liquid is aqueous based. In one embodiment, an aqueous based liquid comprises water. Any suitable aqueous based fluids may be used to facilitate production of wellbore fluids, including any type of water, such as fresh water, ground water, deionized water, distilled water, and/or produced water, among others. In another embodiment, the liquid is organic based (e.g., oil).

With continued reference to FIG. 1, as noted above, the secondary tank (130) may be used to supply secondary materials to facilitate production of wellbore fluids. Although not illustrated, any number of secondary tanks (130) may be used to facilitate provision of secondary materials for creation of wellbore fluids. Further, any suitable secondary materials may be used in the secondary tank (130) to facilitate production of wellbore fluids. For instance, additives and/or cements may be used in the secondary tank (130). The additives may include, for instance, emulsifiers, viscosifiers, fluid loss control agents, surfactants, retarders, accelerators, extenders, densifiers, anti-shrinking agents, and resilient materials, among other components. Such additives may be used to facilitate the production of wellbore fluids having appropriate properties. The cements may be any cements suited to the production of a wellbore fluid, such as cements suited for mixing with drill cuttings, geopolymers, and/or mine tailings to produce a lead barrier fluid or a tail barrier fluid.

A. Spacer Fluid

As noted above, any suitable wellbore fluids may be produced from the drill cuttings, geopolymers, and/or mine tailings (i.e., primary materials). In one embodiment, a wellbore fluid is a spacer fluid. In one embodiment, and with reference to FIG. 1, a spacer fluid may be produced in the wellbore fluid preparation system (100). Any combination of drill cuttings, geopolymers, and/or mine tailings from the primary tank (110), liquid from the liquid tank (120), and secondary materials from the secondary tank (130) may be used to produce a spacer fluid. In one embodiment, the primary materials at least include drill cuttings, wherein drill cuttings from the primary tank (110), liquid (e.g., water) from the liquid tank (120), and optionally secondary materials (e.g., additives) from the secondary tank (130) may be mixed in the primary mixing unit (140) to create a spacer fluid. In another embodiment, the primary materials at least include geopolymer (e.g., synthesized geopolymer), wherein geopolymer from the primary tank (110), liquid from the liquid tank (120), and optionally secondary materials (e.g., additives and/or cements) from the secondary tank (130) may be mixed in the primary mixing unit (140) to create a spacer fluid. In another embodiment, the primary materials at least include mine tailings, wherein mine tailings from the primary tank (110), liquid from the liquid tank (120), and optionally secondary materials (e.g., additives and/or cements) from the secondary tank (130) may be mixed in the primary mixing unit (140) to create a spacer fluid. In one embodiment, the desired density of the spacer fluid is 0.96 to 3.00 g/ml (8 to 25 pounds per gallon), but any suitable spacer fluid densities may be employed. In one embodiment, the density of the spacer fluid in the primary mixing unit (140) may be checked with the density checker (147). The density of the spacer fluid in the primary mixing unit (140) may be adjusted by changing the ratio of primary materials-to-secondary materials-to-liquid (PM:SM:L ratio) as described previously. In one embodiment, the density of the spacer fluid in the primary mixing unit (140) is adjusted by changing the ratio of drill cuttings-to-secondary materials-to-liquid (DC:SM:L ratio). In another embodiment, the density of the spacer fluid in the primary mixing unit (140) is adjusted by changing the ratio of geopolymer-to-secondary materials-to-liquid (G:SM:L ratio). In another embodiment, the density of the spacer fluid in the primary mixing unit (140) is adjusted by changing the ratio of mine tailings-to-secondary materials-to-liquid (MT:SM:L ratio).

In one embodiment, the spacer fluid may be transferred to the secondary mixing unit (160) and optionally mixed. Optionally, adjustment material from the supplement unit (150) may be added to the secondary mixing unit (160) to adjust the spacer fluid composition and/or properties. In one embodiment, the density of the spacer fluid in the secondary mixing unit (160) may be checked with the density checker (167), as described previously. In one embodiment, the density of the spacer fluid in the secondary mixing unit (160) may be adjusted by providing relatively more or less adjustment material from the supplement unit (150) to the secondary mixing unit (160), as needed. In another embodiment, the density of the spacer fluid in the secondary mixing unit (160) may be adjusted by providing relatively more or less spacer fluid of relatively higher or lower density from the primary mixing unit (140) to the secondary mixing unit (160), as needed. Subsequently, the spacer fluid may be transported to a wellbore fluid supply system (e.g., the wellbore fluid supply system (200) of FIG. 2). The spacer fluid may be pumped into the wellbore fluid supply system (200) for various purposes, such as to remove excess mud from the borehole (235) to enhance the placement of the barrier sheath.

In one embodiment, and now with reference to FIG. 2, the spacer fluid may be transported to the wellbore head (210) via the conduit (190). The spacer fluid may then be pumped through the wellbore head (210), down the casing (220), to the wellbore bottom (240). The spacer fluid may then leave the wellbore casing (220) and enter the annulus (250). As more spacer fluid is pumped down the casing (220) the spacer fluid in the annulus (250) may travel up the annulus (250) towards the surface (270). As the spacer fluid moves up the annulus (250), the spacer fluid may remove undesired materials in the annulus (250), such as mud from the edge of the formation (230), to enhance the placement of the barrier sheath. In one embodiment, and as described in further detail below, other wellbore fluids (e.g., lead barrier fluids, tail barrier fluids) may be pumped into the wellbore fluid supply system (200) after the spacer fluid. The other wellbore fluids may be of higher density than the spacer fluid. In one embodiment, the spacer fluid has a lower density than one or more other wellbore fluids (e.g., from 0.01 to 0.24 g/ml lower density). In one embodiment, the spacer fluid has a density lower than the lead barrier fluid. In another embodiment, the spacer fluid has a density lower than the tail barrier fluid. Thus, as subsequent wellbore fluids are pumped down the wellbore fluid supply system (200), the spacer fluid may be further displaced up the annulus (250) towards the surface (270). In one embodiment, the spacer fluid is displaced up the annulus (250) to the wellbore head (210). The spacer fluid may then be transported to a mud pit (290) via a conduit (280). The spacer fluid in the mud pit (290) may then be recycled or disposed of as a waste.

B. Lead Barrier Fluid

As noted above, any suitable wellbore fluids may be produced from the drill cuttings, geopolymers, and/or mine tailings (i.e., primary materials). In one embodiment, a wellbore fluid is a lead barrier fluid. In one embodiment, and with reference to FIG. 1, a lead barrier fluid may be produced in the wellbore fluid preparation system (100). Any combination of drill cuttings, geopolymers, and/or mine tailings from the primary tank (110), liquid from the liquid tank (120), and secondary materials from the secondary tank (130) may be used to produce a lead barrier fluid. In one embodiment, the primary materials at least include drill cuttings, wherein drill cuttings from the primary tank (110), liquid (e.g., water) from the liquid tank (120), and optionally secondary materials (e.g., cement and/or additives) from the secondary tank (130) may be mixed in the primary mixing unit (140) to create a lead barrier fluid. In another embodiment, the primary materials at least include geopolymer (e.g., synthesized geopolymers), wherein geopolymer from the primary tank (110), liquid from the liquid tank (120), and optionally secondary materials (e.g., cement and/or additives) from the secondary tank (130) may be mixed in the primary mixing unit (140) to create a lead barrier fluid. In another embodiment, the primary materials at least include mine tailings, wherein mine tailings from the primary tank (110), liquid from the liquid tank (120), and optionally secondary materials (e.g., cement, additives) from the secondary tank (130) may be mixed in the primary mixing unit (140) to create a lead barrier fluid. In one embodiment, the lead barrier fluid is a lead cement fluid (i.e., a lead barrier fluid including cement). In one embodiment, the desired density of the lead barrier fluid is 0.96 to 3.00 g/ml (8 to 25 pounds per gallon), but any suitable lead barrier fluid densities may be employed. In one embodiment, the density of the lead barrier fluid in the primary mixing unit (140) may be checked with a density checker (147). The density of the lead barrier fluid in the primary mixing unit (140) may be adjusted by changing the ratio of primary materials-to-secondary materials-to-liquid (PM:SM:L ratio) as described previously. In one embodiment, the density of the lead barrier fluid in the primary mixing unit (140) may be adjusted by changing the ratio of drill cuttings-to-secondary materials-to-liquid (DC:SM:L ratio). In another embodiment, the density of the lead barrier fluid in the primary mixing unit (140) may be adjusted by changing the ratio of geopolymer-to-secondary materials-to-liquid (G:SM:L ratio). In another embodiment, the density of the lead barrier fluid in the primary mixing unit (140) may be adjusted by changing the ratio of mine tailings-to-secondary materials-to-liquid (MT:SM:L ratio).

In one embodiment, the lead barrier fluid may be transferred to the secondary mixing unit (160) and optionally mixed. Optionally, adjustment material from the supplement unit (150) may be added to the secondary mixing unit (160) to adjust the lead barrier fluid composition and/or properties. In one embodiment, the density of the lead barrier fluid in the secondary mixing unit (160) may be checked with the density checker (167), as described previously. In one embodiment, the density of the lead barrier fluid in the secondary mixing unit (160) may be adjusted by providing relatively more or less adjustment material from the supplement unit (150) to the secondary mixing unit (160), as needed. In another embodiment, the density of the lead barrier fluid in the secondary mixing unit (160) may be adjusted by providing relatively more or less lead barrier fluid of relatively higher or lower density from the primary mixing unit (140) to the secondary mixing unit (160), as needed. Subsequently, the lead barrier fluid may be transported to a wellbore fluid supply system (e.g., the wellbore fluid supply system (200) of FIG. 2). The lead barrier fluid may be pumped into the wellbore fluid supply system (200) for various purposes, such as to create a barrier sheath to provide zonal isolation for the upper sections of the wellbore.

In one embodiment, and now with reference to FIG. 2, the lead barrier fluid may be transported to the wellbore head (210) via the conduit (190). The lead barrier fluid may then be pumped through the wellbore head (210), down the casing (220), to the wellbore bottom (240). The lead barrier fluid may then leave the wellbore casing (220) and enter the annulus (250). As more lead barrier fluid is pumped down the casing (220) the lead barrier fluid in the annulus (250) may travel up the annulus (250) towards the surface (270). In one embodiment, and as described in further detail above, other wellbore fluids (e.g., spacer fluids) may be pumped into the wellbore fluid supply system (200) before the lead barrier fluid. The other wellbore fluids pumped into the wellbore fluid supply system (200) prior to the lead barrier fluid, may be of lower density than the lead barrier fluid. In one embodiment, the lead barrier fluid has a higher density than one or more wellbore fluids pumped into the wellbore fluid supply system (200) before the lead barrier fluid (e.g., from 0.01 to 0.24 g/ml higher density). In one embodiment, the lead barrier fluid has a density higher than the spacer fluid. Thus, as more lead barrier fluid is pumped down the wellbore fluid supply system (200), the wellbore fluids pumped down the wellbore fluid supply system (200) before to the lead barrier fluid may be further displaced up the annulus (250) towards the surface (270). In another embodiment, and as described in further detail below, other wellbore fluids (e.g., tail barrier fluids) may be pumped into the wellbore fluid supply system (200) after the lead barrier fluid. The other wellbore fluids pumped into the wellbore fluid supply system (200) after the lead barrier fluid may be of higher density than the lead barrier fluid. In one embodiment, the lead barrier fluid has a lower density than one or more other wellbore fluids pumped into the wellbore fluid supply system (200) after the lead barrier fluid (e.g., from 0.01 to 0.24 g/ml lower density). In one embodiment, the lead barrier fluid has a density lower than the tail barrier fluid. Thus, as the subsequent wellbore fluids are pumped down the wellbore fluid supply system (200), the lead barrier fluid may be further displaced up the annulus (250) towards the surface (270). The lead barrier fluid may then set (harden) to form a barrier sheath to provide zonal isolation for the upper sections of the wellbore. In one embodiment, the barrier sheath produced from the lead barrier fluid is a cement sheath (i.e., comprises at least some cement). In another embodiment, the barrier sheath produced from the lead barrier fluid is a non-cement sheath (i.e., is absent of cement).

C. Tail Barrier Fluid

As noted above, any suitable wellbore fluids may be produced from the drill cuttings, geopolymers, and/or mine tailings (i.e., primary materials). In one embodiment, a wellbore fluid is a tail barrier fluid. In one embodiment, and with reference to FIG. 1, a tail barrier fluid may be produced in the wellbore fluid preparation system (100). Any combination of drill cuttings, geopolymers, and/or mine tailings from the primary tank (110), liquid from the liquid tank (120), and secondary materials from the secondary tank (130) may be used to produce a tail barrier fluid. In one embodiment, the primary materials at least include drill cuttings, wherein drill cuttings from the primary tank (110), liquid (e.g., water) from the liquid tank (120), and optionally secondary materials (e.g., cement, additives) from the secondary tank (130) may be mixed in the primary mixing unit (140) to create a tail barrier fluid. In another embodiment, the primary materials at least include geopolymer (e.g., synthesized geopolymers), wherein geopolymer from the primary tank (110), liquid (e.g., water) from the liquid tank (120), and optionally secondary materials (e.g., cement, additives) from the secondary tank (130) may be mixed in the primary mixing unit (140) to create a tail barrier fluid. In another embodiment, the primary materials at least include mine tailings, wherein mine tailings from the primary tank (110), liquid (e.g., water) from the liquid tank (120), and secondary materials (e.g., cement, additives) from the secondary tank (130) may be mixed in the primary mixing unit (140) to create a tail barrier fluid. In one embodiment, the tail barrier fluid is a tail cement fluid (i.e., a tail barrier fluid including cement). In one embodiment, the desired density of the tail barrier fluid is 0.96 to 3.00 g/ml (8 to 25 pounds per gallon), but any suitable tail barrier fluid densities may be employed. In one embodiment, the density of the tail barrier fluid in the primary mixing unit (140) may be checked with a density checker (147). The density of the tail barrier fluid in the primary mixing unit (140) may be adjusted by changing the ratio of primary materials-to-secondary materials-to-liquid (PM:SM:L ratio) as described previously. In one embodiment, the density of the tail barrier fluid in the primary mixing unit (140) may be adjusted by changing the ratio of drill cuttings-to-secondary materials-to-liquid (DC:SM:L ratio). In another embodiment, the density of the tail barrier fluid in the primary mixing unit (140) may be adjusted by changing the ratio of geopolymer-to-secondary materials-to-liquid (G:SM:L ratio). In another embodiment, the density of the tail barrier fluid in the primary mixing unit (140) may be adjusted by changing the ratio of mine tailings-to-secondary materials-to-liquid (MT:SM:L ratio).

In one embodiment, the tail barrier fluid may be transferred to the secondary mixing unit (160) and optionally mixed. Optionally, adjustment material from the supplement unit (150) may be added to the secondary mixing unit (160) to adjust the tail barrier fluid composition and/or properties. In one embodiment, the density of the tail barrier fluid in the secondary mixing unit (160) may be checked with the density checker (167), as described previously. In one embodiment, the density of the tail barrier fluid in the secondary mixing unit (160) may be adjusted by providing relatively more or less adjustment material from the supplement unit (150) to the secondary mixing unit (160), as needed. In another embodiment, the density of the tail barrier fluid in the secondary mixing unit (160) may be adjusted by providing relatively more or less tail barrier fluid of relatively higher or lower density from the primary mixing unit (140) to the secondary mixing unit (160), as needed. Subsequently, the tail barrier fluid may be transported to a wellbore fluid supply system (e.g., the wellbore fluid supply system (200) of FIG. 2). The tail barrier fluid may be pumped into the wellbore fluid supply system (200) for various purposes, such as to create a barrier sheath to provide zonal isolation for the lower sections of the wellbore.

In one embodiment, and now with reference to FIG. 2, the tail barrier fluid may be transported to the wellbore head (210) via the conduit (190). The tail barrier fluid may then be pumped through the wellbore head (210), down the casing (220), to the wellbore bottom (240). The tail barrier fluid may then leave the wellbore casing (220) and enter the annulus (250). As more tail barrier fluid is pumped down the casing (220), the tail barrier fluid in the annulus (250) may travel up the annulus (250) towards the surface (270). In one embodiment, and as described in further detail above, other wellbore fluids (e.g., spacer fluids, lead barrier fluids) may be pumped into the wellbore fluid supply system (200) prior to the tail barrier fluid. The other wellbore fluids may be of lower density than the tail barrier fluid. In one embodiment, the tail barrier fluid has a higher density than one or more other wellbore fluids (e.g., from 0.01 to 0.24 g/ml higher density). In one embodiment, the tail barrier fluid has a density higher than the lead barrier fluid. In another embodiment, the tail barrier fluid has a density higher than the spacer fluid. Thus, as the tail barrier fluid is pumped down the wellbore fluid supply system (200), the other wellbore fluids may be further displaced up the annulus (250) towards the surface (270). The tail barrier fluid may then set (harden) to form a barrier sheath to provide zonal isolation for the lower sections of the wellbore. In one embodiment, the barrier sheath produced from the tail barrier fluid is a cement sheath (i.e., comprises at least some cement). In another embodiment, the barrier sheath produced from the tail barrier fluid is a non-cement sheath (i.e., is absent of cement).

D. Preparation of Geopolymer

As noted above, geopolymer compositions for use in wellbore fluids may be produced from drill cuttings and/or mine tailings, and such geopolymer compositions are referred to herein as "synthesized geopolymers." As it relates to drill cuttings, in one embodiment, and as explained previously with reference to FIG. 4, a drilling system (410) drills the formation (230) to create the borehole (235). In the illustrated embodiment, a water table (260) may be located proximal to the borehole (235) and above the wellbore bottom (240). Typically, as the drill bit (425) drills through the formation (230), drill cuttings (427) are created. A drilling fluid (426) may be pumped down the drill string (420) to the drill bit (425) to cool and lubricate the drill bit (425). The drilling fluid (426) may include oil drilling fluid, water drilling fluid, synthetic drilling fluid, and combinations thereof. After the drilling fluid (426) is pumped out of the drill string (420), the drilling fluid (426) may mix with the drill cuttings (427). The drill cuttings (427) mixed with the drilling fluid (426) are wet drill cuttings (427). The wet drill cuttings (427) may include oil drill cuttings (i.e., drill cuttings mixed with oil drilling fluid), water drill cuttings (i.e., drill cuttings mixed with water drilling fluid), synthetic drill cuttings (i.e., drill cuttings mixed with synthetic drilling fluid), and combinations thereof. As the drilling fluid (426) is used during drilling operations, the wet drill cuttings (427) may move to the surface (270).

In one embodiment, after the wet drill cuttings (427) reach the drilling system (410), the wet drill cuttings (427) are transported to the primary treatment system (430), which acts to remove most or all of the drilling fluid (426) and/or drilling mud from the wet drill cuttings (427). In one embodiment, the primary treatment system (430) is located locally at the drilling location, i.e., is on-site. The primary treatment system (430) may include equipment such as shale shakers, hydro cyclones, separators, grinders, and centrifuges. In one embodiment, the primary treatment system may size the drill cuttings (427). In one embodiment, sizing the drill cuttings (427) may include sorting the drill cuttings (427). Sorting the drill cuttings may include sieving the drill cuttings (427), filtering the drill cuttings (427), and combinations thereof. In one embodiment, sizing the drill cuttings may include comminuting the drill cuttings (427). Comminuting the drill cuttings may include grinding the drill cuttings (427), pulverizing the drill cuttings (427), crushing the drill cuttings (427), and combinations thereof. The separated and/or sized drill cuttings (427) may then be transported to a drill cuttings tank (310) via a conduit (435). The drill cuttings may then be used to produce one or more synthesized geopolymers on-site, such as via use of the geopolymer production system (300) of FIG. 3. The separating and sizing steps may occur in any order and may be repeated as needed to achieve drill cuttings on an appropriate size and/or shape.

In another embodiment, and with reference to FIG. 5 the drill cuttings (427) may be transported from the wellbore location (510) to an off-site preparation location (520) to produce one or more synthesized geopolymers, as described in further detail below.

Optionally, and with reference to FIG. 4, the drill cuttings (427) may be processed in a secondary preparation unit (450), which secondary preparation unit (450) may be located on-site or off-site. In the secondary preparation unit (450), the drill cuttings (427) may be further processed, such as to remove additional drilling fluids and/or prepare drill cuttings of an appropriate size for geopolymer production. In one embodiment, after the drill cuttings (427) have been processed in the secondary preparation unit (450), the drill cuttings (427) may be used to prepare one or more synthesized geopolymer materials on-site, such as via use of the geopolymer production system (300) of FIG. 3. In another embodiment, after the drill cuttings (427) have been processed in the secondary preparation unit (450), the drill cuttings (427) are transported off-site. In yet another embodiment, the drill cuttings (427) are transported from the drill location to a remote (off-site) secondary preparation unit. The off-site secondary preparation unit may be located at the off-site preparation location (520), such as that illustrated in FIG. 5.

After any necessary processing, the drill cuttings (427) may be used to produce one or more synthesized geopolymer materials. For instance, and in reference to FIG. 3, a synthesized geopolymer may be produced on-site in the geopolymer production system (300). The synthesized geopolymer may also be produced off-site in an off-site geopolymer production system (e.g., a system similar to that of FIG. 3, but off-site). In one embodiment, dry drill cuttings (427) from the drill cuttings tank (310) may be transported via the conduit (315) to the geopolymer production tank (340). In another embodiment, wet drill cuttings from the drill cuttings tank (310) may be transported via the conduit (315) to the geopolymer production tank (340).

In one embodiment, one or more alkaline activators from the alkaline activator source (320) may be transported via the conduit (325) to the geopolymer production tank (340). The one or more alkaline activators may be any chemical suited for production of geopolymers from drill cuttings, such as hydroxides, silicates, oxides, carbonates, aluminates, and combinations thereof. In one embodiment, an alkaline activator comprises a hydroxide. Suitable hydroxides include those produced from alkali metals or alkaline earth metals, such as lithium hydroxide, sodium hydroxide, potassium hydroxide, and calcium hydroxide, among others. In another embodiment, an alkaline activator comprises a silicate. Suitable silicates include those produced from alkali metals or alkaline earth metals, such as lithium silicate, sodium silicate, sodium metasilicate, potassium silicate, and calcium silicate, among others. In another embodiment, an alkaline activator comprises an oxide. Suitable oxides include those produced from alkali metals or alkaline earth metals, such as lithium oxide, sodium oxide, potassium oxide, and calcium oxide, among others. In another embodiment, an alkaline activator comprises a carbonate. Suitable carbonates include those produced from alkali metals or alkaline earth metals, such as lithium carbonate, sodium carbonate, potassium carbonate, and calcium carbonate, among others. In another embodiment, an alkaline activator comprises an aluminate. Suitable aluminates include those produced from alkali metals or alkaline earth metals, such as lithium aluminate, sodium aluminate, potassium aluminate, and calcium aluminate, among others. In one embodiment, the alkaline activators may be in the liquid phase. In another embodiment, the alkaline activators may be in the solid phase.

In one embodiment, liquid (e.g., water) may optionally be transported from the liquid source (330) to the geopolymer production tank (340) via the conduit (335). Any suitable liquid may be used to facilitate production of geopolymers including aqueous and/or organic fluids. In one embodiment, the liquid is aqueous based. In one embodiment, an aqueous based liquid comprises water. In another embodiment, the liquid is organic based.

In one embodiment, to produce a synthesized geopolymer, drill cuttings from the drill cuttings tank (310), one or more alkaline activators from the alkaline activator source (320) and optionally liquid from the liquid source (330) may be added to the geopolymer production tank (340), and at a ratio sufficient to produce a synthesized geopolymer. In one embodiment, the drill cuttings have relatively high concentrations of silicon dioxide ($SiO_2$) and aluminum oxide ($Al_2O_3$) (e.g., 71% $SiO_2$, 26% $Al_2O_3$ by volume). The silicon dioxide and aluminum oxide may dissolve upon mixing with the alkaline activators. The dissolved silicon dioxide and aluminum oxide may further react with alkali hydroxides in the alkali activators to form silicon-based and/or aluminum-based monomers (e.g., $SiO_2(OH)_2$, $Al(OH)_4$). The alkali hydroxides may then cause the silicon-based and/or aluminum-based monomers to undergo polycondensation, to form a polymer (i.e., a geopolymer). The drill cuttings, alkaline activator and optionally liquid may be held and/or mixed (e.g., contacted) in the geopolymer production tank (340) for a time sufficient to produce a synthesized geopolymer. For instance, the drill cuttings, alkaline activator and optionally liquid may be held and/or mixed for a time sufficient for the materials to react to produce a synthesized geopolymer. In one embodiment, the geopolymer in the geopolymer production tank (340) may be transported to the primary tank (110). In another embodiment, the materials used to produce geopolymer (e.g., drill cuttings, alkaline activator, liquid) may be transported directly to the primary tank (110), and such materials may be held and/or mixed (e.g., contacted), in the primary tank (110), for a time sufficient for the materials to react to produce a geopolymer. In either case, the produced geopolymer may be held in one or both of the geopolymer production tank (340) or the primary tank (110) for immediate use or later use in a wellbore fluid preparation system (100), such as that illustrated in FIG. 1.

iii. Composition

As noted above, various wellbore fluids (e.g., a spacer fluid, a lead barrier fluid, and/or a tail barrier fluid) may be used to create barrier fluid compositions for use in wellbore fluid supply applications. Any suitable volume of primary materials may be used to create any suitable wellbore fluid composition, optionally with liquid, optionally with secondary materials. For instance, in some embodiments, a wellbore fluid may be entirely composed of geopolymer without the need to add additional liquid and/or secondary materials.

In one embodiment, the wellbore fluid composition is a spacer fluid composition. Spacer fluid compositions may include any suitable amount of primary materials (drill cuttings, geopolymers, mine tailings), optional liquid (e.g., water), and optional secondary materials (e.g., additives and/or cements). In one approach, a spacer fluid composition is free of secondary materials, i.e., is based on a mixture of primary materials and liquid. In another approach, secondary materials (e.g., additives) may be used with primary materials to produce a spacer fluid.

In another embodiment, the wellbore fluid composition is a lead barrier fluid composition. Lead barrier fluid compositions may include any suitable amount of primary materials (drill cuttings, geopolymers, mine tailings), optional liquid (e.g., water), and optional secondary materials (e.g., cement and/or additives).

In another embodiment, the wellbore fluid composition is a tail barrier fluid composition. Tail barrier fluid compositions may include any suitable amount of primary materials (drill cuttings, geopolymers, mine tailings), optional liquid (e.g., water), and optional secondary materials (e.g., cement and/or additives).

In another embodiment, the wellbore fluid composition is a plugging fluid composition. Plugging fluid may be used in wellbore plugging applications to plug a wellbore. Plugging fluid compositions may include any suitable amount of primary materials (drill cuttings, geopolymers, mine tailings), optional liquid (e.g., water), and optional secondary materials (e.g., cement and/or additives). In one embodiment, the plugging fluid may be a cement plugging fluid (i.e., a plugging fluid with cement).

In another embodiment, the wellbore fluid composition is a squeeze fluid composition. Squeeze fluid may be used in wellbore squeeze applications, for instance, to repair a barrier sheath in a wellbore. Squeeze fluid compositions may include any suitable amount of primary materials (drill cuttings, geopolymers, mine tailings), optional liquid (e.g., water), and optional secondary materials (e.g., cement and/or additives). In one embodiment, the squeeze fluid may be a cement squeeze fluid (i.e., a squeeze fluid with cement).

In another embodiment, the wellbore fluid composition is a grouting fluid composition. Grouting fluid may be used in wellbore grouting applications, for instance, to repair a barrier sheath in a wellbore. Grouting fluid compositions may include any suitable amount of primary materials (drill cuttings, geopolymers, mine tailings), optional liquid (e.g., water), and optional secondary materials (e.g., cement and/or additives). In one embodiment, the grouting fluid may be a cement grouting fluid (i.e., a grouting fluid with cement).

As noted above secondary materials may be used in producing wellbore fluids. Secondary materials may include additives and/or cement. Additives may include one or more additives suited for production of wellbore fluids. In one embodiment, additives may include, emulsifiers, viscosifiers, fluid loss control agents, surfactants, retarders, accelerators, extenders, densifiers, anti-shrinking agents, resilient materials, and combinations thereof. In one embodiment, emulsifiers may promote the separation of mud in a wellbore. Suitable emulsifiers may include amides (e.g., acetomide), amines, and amidoamines, among others. In one embodiment, viscosifiers may increase the viscosity of a wellbore fluid. Suitable viscosifiers may include clay-based viscosifiers (e.g., bentonite) and polymer-based viscosifiers (e.g., hydroxyethylcellulose, xantham gum, polyanionic cellulose), among others. In one embodiment, a fluid loss control agent may control the loss of aqueous phase cement system to the formation. Suitable fluid loss control agents include chemicals such as, water soluble polymers (e.g., hydroxyethylcellulose), cellulose derivatives (e.g., polypeptide, ethylenediaminecarboxymethylcellulose), and finely divided particulates (e.g., bentonite, carbonate powder, asphaltenes, thermoplastic resins), among others. In one embodiment, fluid loss control agents may include gas migration control agents. In one embodiment, gas migration control agents may prevent and/or control the flow of gases though the wellbore fluid and/or barrier sheath. Suitable gas migration control agents include latexes (e.g., polymer latexes) and silica fume, among others. In one embodiment, surfactants may decrease the surface tension and/or the interfacial tension between chemicals in the wellbore fluids. In one embodiment, surfactants may include liquid surfactants and/or solid surfactants. In one embodiment, surfactants may include wetting agents, anti-foam agents, defoamers, and dispersants. In one embodiment, a dispersant may reduce agglomeration of particles in a wellbore fluid. Suitable dispersants include chemicals such as sulfonates (e.g., polymelamine sulfonate, polynaphthalene sulfonate, polystyrene sulfonate), polysaccharides (e.g., cellulose derivatives, ethylene oxide polymers, polyglycol), silicas (e.g., microsilica, silica fume), and non-polymeric chemicals (e.g., hydroxycarboxylic acids), among others. In one embodiment, wetting agents may lower surface tension of the wellbore fluids. Suitable wetting agents include alkyl-based surfactants, peptides, lipids, and polymers, among others. In one embodiment, anti-foam agents may prevent or reduce the foaming of a wellbore fluid during mixing (e.g., by adding an anti-foaming agent to a liquid or wellbore fluid prior to mixing). Suitable anti-foam agents include polyglycol ethers (e.g., polypropylene glycol) and silicons, among others. Conversely, defoamers may reduce or eliminate foam that has formed due to mixing. Suitable defoamers include insoluble oils, polyethers (e.g., alkyl polyethers, silicone polyethers), and phosphates (e.g., tributyl phosphate), among others. In one embodiment, retarders may extend the setting time of a wellbore fluid. Suitable retarders include lignosulfonates, saccharide compounds, hydroxycarboxylic acid, cellulose derivatives, organophosphonates, and inorganic compounds, among others. In one embodiment, an accelerator may reduce the setting time of a cement system and/or may increase the rate of compressive strength development of the wellbore fluid. Suitable accelerators include chemicals such as inorganic salts such as chlorides (e.g., calcium chloride), carbonates, and silicates (e.g., sodium silicate), among others. In one embodiment, extenders may lower the density of a cement system, and/or reduce the quantity of cement per unit volume. Suitable extenders include clays, sodium silicates, pozzolans, fly ashes, hollow spheres, other lightweight materials, and diatomaceous earth, among others. In one embodiment, densifiers may include weighting agents. In one embodiment, weighting agents may increase the density of a cement system. Suitable weighting agents include chemicals that have a higher density than the wellbore fluid such as ilmenite, hematite, and barite, among others. In one embodiment, anti-shrinking agents may reduce and/or control the shrinking of a barrier sheath in a wellbore (e.g., to maintain the connection between the casing, the barrier sheath, and the formation). Suitable anti-shrinking agents include magnesium oxide, aluminum powder, and ethylene glycol derivatives, among others. In one embodiment, resilient materials may make barrier sheaths more resilient to changes in the wellbore conditions (e.g., temperature and pressure changes). Suitable resilient materials may include asphaltenes, rubbers, silica fume, and microspheres, among others.

As noted above, the secondary materials may include cements. The cements may be any cements suited to the production of a wellbore fluid, such as cements suited for mixing with drill cuttings, geopolymers, and/or mine tailings to produce a lead barrier fluid or a tail barrier fluid. Examples of suitable cements include any class (e.g., class A-H) of Ordinary Portland cement (OPC), Portland pozzolana cement (PPC), ASTM standard cements, Portland limestone cements (1 L cements), calcium sulfoaluminate cements (CSA), slag cement, and rapid hardening cement, among others.

iv. Properties

As noted above, primary materials may be used to produce any appropriate wellbore fluid. The amount of primary materials used in those wellbore fluids, as well as the amount of optional liquid and the amount of optional secondary materials used in those wellbore fluids, may be selected to achieve one or more preselected wellbore properties. The wellbore properties may be, for instance wellbore fluid properties or barrier sheath properties. Wellbore fluid properties may be one or more of density, rheology, and set time, among others. Barrier sheath properties may be one or more of tensile strength, compressive strength, shear strength, and bonding strength, among others. In one embodiment, one or more wellbore properties are derived from a suitable computer program, such as the software program CEMLAB made by Pegasus Vertex, Inc. located at 6100 Corporate Dr., Suite 448, Houston, TX 77036, USA. To achieve the one or more wellbore properties, the ratio of primary materials-to-secondary materials-to-liquid (PM:SM:L ratio) may be preselected. After or concomitant to the preselecting, the selected ratio of primary materials-to-secondary materials-to-liquid (PM:SM:L ratio) may be mixed to produce the wellbore fluid.

In one embodiment, the preselected ratio of primary materials-to-secondary materials-to-liquid (PM:SM:L ratio) may be achieved in near real-time by (a) appropriate real-time provision of primary materials, liquid, and/or secondary materials to a primary mixing unit and/or (b) provision of adjustment materials from a supplement unit. For instance, flow rates of materials may be adjusted in real-time to achieve the desired primary materials-to-secondary materials-to-liquid (PM:SM:L ratio). In one embodiment, one or more flow rates of primary materials from a primary materials source to a mixing destination are controlled. In one embodiment, one or more flow rates of a liquid from a liquid source to a mixing destination are controlled. In one embodiment, one or more flow rates of secondary materials from a secondary materials source to a mixing destination are controlled. In one embodiment, one or more flow rates of an adjustment material from a supplement unit are controlled. Any of the primary materials, liquids, secondary materials, and adjustment material flow rates may be controlled to achieve the desired ratio of primary materials-to-secondary materials-to-liquid (PM:SM:L ratio) and, if desired, in near real-time. The flow rate adjustments may be made individually or jointly, and in succession or contemporaneously.

In one embodiment, a first wellbore property may be selected for a spacer fluid. Accordingly, a first ratio of primary materials-to-secondary materials-to-liquid (PM:SM:L ratio) may be selected to achieve the first wellbore property. The spacer fluid may then be produced in accordance with the first ratio. The spacer fluid may then be used in the wellbore fluid supply system as described above. For instance, a spacer fluid density of from 0.96 to 3.00 g/ml (8 to 25 pounds per gallon) may be selected as the first wellbore property. Correspondingly, a first ratio of primary materials-to-secondary materials-to-liquid (PM:SM:L ratio) may be selected to achieve the spacer fluid density of from 0.96 to 3.00 g/ml (8 to 25 pounds per gallon), after which the spacer fluid may be used in the wellbore fluid supply system as described above. The same methodology may be used for other wellbore properties (e.g., tensile strength, set time, compressive strength), alone or in combination with other wellbore properties.

In one embodiment, a second wellbore property may be selected for a lead barrier fluid. Accordingly, a second ratio of primary materials-to-secondary materials-to-liquid (PM:SM:L ratio) may be selected to achieve the second wellbore property. The lead barrier fluid may then be produced in accordance with the second ratio. The lead barrier fluid may then be used in the wellbore fluid supply system as described above. For instance, a lead barrier fluid density of from 0.96 to 3.00 g/ml (8 to 25 pounds per gallon) may be selected as the second wellbore property. Correspondingly, a second ratio of primary materials-to-secondary materials-to-liquid (PM:SM:L ratio) may be selected to achieve the lead barrier fluid density of from 0.96 to 3.00 g/ml (8 to 25 pounds per gallon), after which the lead barrier fluid may be used in the wellbore fluid supply system as described above. The same methodology may be used for other wellbore properties (e.g., tensile strength, set time, compressive strength), alone or in combination with other wellbore properties.

In one embodiment, a third wellbore property may be selected for a tail barrier fluid. Accordingly, a third ratio of primary materials-to-secondary materials-to-liquid (PM:SM:L ratio) may be selected to achieve the third wellbore property. The tail barrier fluid may then be produced in accordance with the third ratio. The tail barrier fluid may then be used in the wellbore fluid supply system as described above. For instance, a tail barrier fluid density of from 0.96 to 3.00 g/ml (8 to 25 pounds per gallon) may be selected as the third wellbore property. Correspondingly, a third ratio of primary materials-to-secondary materials-to-liquid (PM:SM:L ratio) may be selected to achieve the tail barrier fluid density of from 0.96 to 3.00 g/ml (8 to 25 pounds per gallon), after which the tail barrier fluid may be used in the wellbore fluid supply system as described above. The same methodology may be used for other wellbore properties (e.g., tensile strength, set time, compressive strength), alone or in combination with other wellbore properties.

In one embodiment the first, second, and third wellbore property may be the same wellbore property. For instance, the first, second, and third wellbore property may all relate to density. In one embodiment, the first density may be different than the second and/or third densities (e.g., when successive spacer fluid, lead barrier fluid, and tail barrier fluid wellbore fluids are used). In another embodiment, the first density may be the same as the second density and/or third density (e.g., when a single wellbore fluid is used, but with different additives to achieve different wellbore properties.) The same principles apply to the second and third wellbore properties.

In another embodiment, the first and second wellbore property may be the same wellbore property, and the third wellbore property may be a different wellbore property. For instance, the first and second wellbore property may relate to density, and the third wellbore property may relate to tensile strength. In yet another embodiment, the first and third wellbore property may be the same wellbore property, and the second wellbore property may be a different wellbore property. In yet another embodiment, the second and third wellbore property may be the same wellbore property, and the first wellbore property may be a different wellbore property. In yet another embodiment, the first, second, and third wellbore property may all be different wellbore properties. For instance, the first wellbore property may relate to density, the second wellbore property may relate to tensile strength, and the third wellbore property may relate to set time.

In one embodiment, a first wellbore fluid is produced with a first ratio of primary materials-to-secondary materials-to-liquid (PM:SM:L ratio) to achieve a first wellbore property. After or concomitant to the production of the first wellbore fluid, the first wellbore property of the first wellbore fluid may be verified. For instance, when the first wellbore property is density, a density checker, such as those described above, may be used to check whether the density of the wellbore fluid corresponds to the selected density. If the density corresponds to the selected density, then the wellbore fluid may be deemed suitable for use and may be used in the wellbore fluid supply system as described above. If the density does not correspond to the selected density, then the wellbore fluid may be adjusted by adding appropriate materials (e.g., primary materials, secondary materials, liquid, adjustment materials) as appropriate to achieve the selected density.

In one embodiment, multiple different wellbore fluids are created in succession. For instance, a first wellbore fluid and a second wellbore fluid may be produced in succession. The first wellbore fluid may have a first wellbore property and the second wellbore fluid may have a second wellbore property. After production of the first wellbore fluid having the first wellbore property, the production of the second wellbore fluid having the second wellbore property may commence, either immediately or after a delay. In one embodiment, the production of the second wellbore fluid occurs wherein the ratio of primary materials-to-secondary materials-to-liquid (PM:SM:L ratio) of the first wellbore fluid is adjusted to achieve the wellbore property of the second wellbore fluid, thus creating the second wellbore fluid.

In one embodiment, the first wellbore fluid is a spacer fluid, and the second wellbore fluid is a lead barrier fluid. In another embodiment, the first wellbore fluid is a spacer fluid, and the second wellbore fluid is a tail barrier fluid. In yet another embodiment, the first wellbore fluid is a lead barrier fluid, and the second wellbore fluid is a tail barrier fluid. In yet another embodiment, the first wellbore fluid is a spacer fluid, the second wellbore fluid is a lead barrier fluid, and the third wellbore fluid is a tail barrier fluid.

v. System Applications

As may be appreciated, primary materials may be used to produce a single wellbore fluid or to produce multiple wellbore fluids in a single wellbore fluid supply system. For instance, as described above, a wellbore fluid supply system (e.g., a wellbore fluid supply system (200) of FIG. 2), may require multiple wellbore fluids (e.g., a spacer fluid, a lead barrier fluid, a tail barrier fluid). It is anticipated that more than one wellbore fluid in the wellbore fluid supply system may use primary materials. For example, in one embodiment, primary materials may be used in a spacer fluid, a lead barrier fluid, and a tail barrier fluid in the same wellbore fluid supply system. In another embodiment, primary materials may be used in a spacer fluid and tail barrier fluid in the same wellbore fluid supply system. In yet another embodiment, primary materials may be used in the spacer fluid and the lead barrier fluid in the same wellbore fluid supply system. In yet another embodiment, primary materials may be used in the lead barrier fluid and the tail barrier fluid in the same wellbore fluid supply system.

As noted above, the wellbore fluid supply system may supply one or more wellbore fluids to the wellbore. In one embodiment, the one or more wellbore fluids supplied to the wellbore may include one or more barrier fluids (e.g., a lead barrier fluid, a tail barrier fluid). In one embodiment, the one or more barrier fluids may then be pumped into the annulus of the wellbore. The one or more barrier fluids in the annulus may then set (e.g., harden, solidify) in the annulus of the wellbore to create one or more substantially impermeable barrier sheaths (e.g., lead barrier sheath, tail barrier sheath). In one embodiment, the one or more barrier sheaths may be cement barrier sheaths (i.e., a barrier sheath comprising at least some cement). The cement for the cement barrier sheaths may be supplied as a secondary material for mixing with primary materials (if needed and as needed), as described above. In another embodiment, the one or more barrier sheaths may be non-cement barrier sheaths (i.e., barrier sheaths comprising no cement).

While prior embodiments were described in which a wellbore fluid supply system (e.g., a wellbore fluid supply system (200) of FIG. 2) used three wellbore fluids (e.g., a spacer fluid, a lead barrier fluid, and a tail barrier fluid), it is also anticipated that wellbore fluid supply systems may require more or less wellbore fluids. For instance, in one embodiment, a wellbore fluid supply system (e.g., a wellbore fluid supply system (200) of FIG. 2) may only require a single wellbore fluid (e.g., a tail barrier fluid) or only two wellbore fluids (e.g., a spacer fluid). It is anticipated that primary materials may be used in one or both of the wellbore fluids required by the wellbore fluid supply system, using any of previous embodiments described above. Similarly, a wellbore fluid supply system may require additional wellbore fluids (e.g., wellbore fluids in addition to a spacer fluid, a lead barrier fluid, and a tail barrier fluid). It is also anticipated that primary materials may be used in any additional wellbore fluids that may be used in such wellbore fluid supply systems.

vi. Alternative Other Embodiments

A. Mine Tailings as a Geopolymer

As noted above, synthesized geopolymers may be produced from drill cuttings. It is anticipated that synthesized geopolymers may also be produced from mine tailings. Mine tailings may include any suitable waste from a mining operation. In one embodiment, mine tailings may include waste from mineral mines, ore mines, gem mines, and combinations thereof. As also noted above, in one embodiment, before the mine tailings are used to produce synthesized geopolymer, the mine tailings may be prepared (e.g., separated, dried, sized). In one embodiment, the mine tailings are waste from a mining operation that may be converted to one or more synthesized geopolymers. As described previously, it is anticipated that mine tailings may be substituted for drill cuttings or used in addition to drill cuttings as it relates to the production of synthesized geopolymers. In one embodiment, mine tailings (without any drill cuttings) may be used with alkaline activators and optionally liquid (e.g., water), among other materials, to produce one or more synthesized geopolymers. In another embodiment, a mixture of drill cuttings and mine tailings may be used with alkaline activators and optionally liquid, among other materials, to produce one or more synthesized geopolymers.

B. Drill Cuttings and or Mine Tailings as Substitute for Geopolymer

As noted above, drill cuttings may be used to produce one or more synthesized geopolymers. In another approach, and as explained above, drill cuttings may be utilized in lieu of or in addition to geopolymers to produce wellbore fluids. Drill cuttings may be, for instance, drill cuttings that are obtained during normal drilling operations, but are not converted to a geopolymer. As also noted above, drill cuttings may be comminuted (e.g., ground) to a smaller size before being used in wellbore fluids. Moreover, drill cuttings and geopolymer materials may be used in any combination to produce one or more wellbore fluids. For instance, in one embodiment, a wellbore fluid may include drill cuttings, optionally with geopolymers. In another embodiment, a wellbore fluid may include both geopolymer materials and drill cuttings. These wellbore fluids may be any of the wellbore fluids previously described, such as any of the spacer fluid, lead barrier fluid, and tail barrier fluid.

As noted above, mine tailings may be used to produce one or more synthesized geopolymers. In another approach, and as noted above, mine tailings may be used in lieu of or in addition to geopolymers to produce wellbore fluids. Moreover, mine tailings, drill cuttings, and/or geopolymer materials may be used in any combination to produce one or more wellbore fluids. For instance, in one embodiment, a wellbore fluid may include mine tailings, optionally with geopolymers and/or drill cuttings. In another embodiment, a wellbore fluid may include drill cuttings and one or both of geopolymers and/or drill cuttings. These wellbore fluids may be any of the wellbore fluids previously described, such as any of the spacer fluid, lead barrier fluid, and tail barrier fluid.

C. On-Site and or Off-Site Preparation

As noted above, drill cuttings may be processed on-site to produce one or more synthesized geopolymers. For instance, drill cuttings from the wellbore location may be used to produce synthesized geopolymers on-site. In other embodiments, it is anticipated that drill cuttings from the wellbore location (510) may be used to produce synthesized geopolymers off-site, such as that illustrated in FIG. 5. For instance, in one embodiment and with continued reference to FIG. 5, drill cuttings from the wellbore location (510) are transported to an off-site geopolymer production system (e.g., a system similar to that of FIG. 3, but off-site). In one embodiment, the off-site geopolymer production system may be at the off-site preparation location (520). In another embodiment, the off-site geopolymer production system may be at the secondary wellbore location (515). The drill cuttings at the off-site geopolymer production system may then be used to produce a synthesized geopolymer. In one embodiment, the synthesized geopolymer made at the off-site geopolymer production system, may then be transported to the wellbore location (510). In another embodiment, the synthesized geopolymer made at the off-site geopolymer production system may be transported to the secondary wellbore location (515). In yet another embodiment, the synthesized geopolymer made at the off-site geopolymer production system may be further mixed with liquids (e.g., water) and/or secondary materials (e.g., cements, additives) at the off-site preparation location (520) as described in further detail below. The synthesized geopolymer may then be used in one or more wellbore fluids, as described above. These wellbore fluids may be any of the wellbore fluids previously described, such as any of the spacer fluid, lead barrier fluid, and tail barrier fluid.

As noted above, and with continued reference to FIG. 5, mine tailings may be used in the geopolymer production process. It is anticipated that mine tailings may be transported from the mine tailing location (530) to the wellbore location (510) to be used in the geopolymer production process. In another embodiment, the mine tailings may be transported from the mine tailing location (530) to the off-site preparation location (520). In yet another embodiment, the mine tailings may be transported from the mine tailing location (530) to the secondary wellbore location (515). The mine tailings may then be used in the on-site and/or off-site geopolymer production process. In one embodiment, the transported mine tailings may be substituted for drill cuttings or used in addition to drill cuttings in the geopolymer production process as described above (e.g., to produce a synthesized geopolymer).

As noted above, prior embodiments described mixing primary materials, optional liquid, and optional secondary materials in a wellbore fluid preparation system, such as that illustrated in FIG. 1. It is also anticipated that the primary materials (drill cuttings, geopolymers, mine tailings) and secondary materials (e.g., cements, additives) may be mixed prior to the production of one or more wellbore fluids. In one embodiment, and with reference to FIG. 5, the primary materials and secondary materials may be mixed at the wellbore location (510), to create a precursor mixture, for subsequent use in the production of one or more wellbore fluids. In another embodiment, the primary materials and secondary materials may be mixed at an off-site preparation location (520), to create the precursor mixture. The precursor mixture at the off-site preparation location (520) may then be transported from the off-site preparation location (520) to the wellbore location (510) or to the secondary wellbore location (515). Accordingly, the precursor mixture may then be used to create one or more wellbore fluids in a wellbore fluid preparation system (e.g., a system similar to FIG. 1, but with a combined primary and secondary tank), such as by adding liquid and/or additives thereto. These wellbore fluids may be any of the wellbore fluids previously described, such as any of the spacer fluid, lead barrier fluid, and tail barrier fluid.

vii. Definitions

As used herein, "cement" means any cementitious composition suited for use in its intended end-use application, optionally with any suitable additives. Examples of cement may include any class (e.g., class A-H) of Ordinary Portland cement (OPC), Portland pozzolana cement (PPC), ASTM standard cements, Portland limestone cements (1 L cements), calcium sulfoaluminate cements (CSA), slag cement, and rapid hardening cement, among others. In one embodiment, a cement is a wellbore cement, suited for use in a wellbore cementing application.

As used herein, "tank" means any receptacle suited to hold (e.g., contain) a fluid. In one embodiment, a tank is a fixed structure (e.g., permanently mounted at a location). In another embodiment, a tank is a moveable structure (e.g., located on a moveable vehicle). Examples of suitable tanks for use herein include in-ground tanks, tractor trailer tanks, and bulk truck tanks, among others.

viii. Miscellaneous

These and other aspects, advantages, and novel features of this new technology are set forth in part in the description that follows and will become apparent to those skilled in the art upon examination of the following description and figures, or may be learned by practicing one or more embodiments of the technology provided for by the present disclosure.

Among those benefits and improvements that have been disclosed, other objects and advantages of this disclosure will become apparent from the preceding description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given in connection with the various embodiments of the disclosure is intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though they may. Furthermore, the phrases "in another embodiment" and "in some other embodiments" as used herein do not necessarily refer to a different embodiment, although they may. Thus, various embodiments of the disclosure may be readily combined, without departing from the scope or spirit of the disclosure.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references, unless the context clearly dictates otherwise. The meaning of "in" includes "in" and "on", unless the context clearly dictates otherwise.

While a number of embodiments of the present disclosure have been described, it is understood that these embodiments are illustrative only, and not restrictive, and that many modifications may become apparent to those of ordinary skill in the art. However, it is to be expressly understood that such modifications and adaptations are within the spirit and scope of the present disclosure. Further still, unless the context clearly requires otherwise, the various steps may be carried out in any desired order, and any applicable steps may be added and/or eliminated.

What is claimed is:

1. A method comprising:
   (a) obtaining local drill cuttings, wherein the local drill cuttings are drill cuttings obtained from a wellbore at a wellbore location;
   (b) preparing, at the wellbore location, the local drill cuttings for use in a wellbore fluid;
   (c) creating, at the wellbore location, the wellbore fluid having the local drill cuttings;
   (d) pumping, at the wellbore location, the wellbore fluid into a casing of a wellbore;
      (i) wherein the pumping comprises pumping the wellbore fluid into an annulus of the wellbore;
   (e) maintaining the wellbore fluid in the annulus of the wellbore; and
   (f) allowing the wellbore fluid to set, thereby creating a substantially impermeable barrier sheath.

2. The method of claim 1, wherein the local drill cuttings comprise dry drill cuttings, wet drill cuttings, and combinations thereof.

3. The method of claim 2, wherein the preparing step (b) comprises drying the local drill cuttings thereby removing drilling fluid and/or drilling mud from the local drill cuttings.

4. The method of claim 1, wherein the wellbore fluid is selected from the group consisting of a lead barrier fluid and a tail barrier fluid.

5. The method of claim 1, wherein the obtaining step (a) comprises drilling the wellbore, thereby creating the local drill cuttings.

6. The method of claim 1, wherein the creating step (c) comprises mixing the local drill cuttings with a liquid.

7. The method of claim 6, wherein the liquid is aqueous.

8. The method of claim 6, wherein the creating step (c) comprises mixing geopolymer with the local drill cuttings and the liquid to create the wellbore fluid.

9. The method of claim 8, wherein the geopolymer is a synthesized geopolymer.

10. The method of claim 8, wherein the geopolymer is a sourced geopolymer.

11. The method of claim 6, wherein the creating step (c) comprises mixing mine tailings with the local drill cuttings and the liquid to create the wellbore fluid.

12. The method of claim 6, wherein the preparing step (b) comprises sizing the local drill cuttings for use in the wellbore fluid.

13. The method of claim 12, wherein the sizing comprises comminuting the local drill cuttings.

14. The method of claim 13, wherein the comminuting comprises grinding the local drill cuttings, pulverizing the local drill cuttings, crushing the local drill cuttings, and combinations thereof.

15. The method of claim 1, wherein the preparing step (b) comprises reacting at least a portion of the local drill cuttings with a reactant, thereby producing synthesized geopolymer.

16. The method of claim 15, wherein the reacting comprises causing the local drill cuttings to undergo polycondensation to form the synthesized geopolymer.

17. The method of claim 15, wherein the creating step (c) comprises creating the wellbore fluid having the local drill cuttings and the synthesized geopolymer.

18. The method of claim 1, wherein the wellbore fluid is selected from the group consisting of a plugging fluid, a squeeze fluid, and a grouting fluid.

19. The method of claim 1, wherein prior to the creating step (c), preselecting a density of the wellbore fluid, and wherein the wellbore fluid realizes a preselected density.

20. A system comprising:
   (a) a first mixing unit adapted to mix at least one primary material, at least one secondary material, and at least one liquid to create a cementitious wellbore fluid;
      (i) wherein the at least one primary material comprises drill cuttings and optionally one or more of, synthesized geopolymers and mine tailings;
      (ii) wherein the at least one secondary material comprises cements and optionally additives; and
      (iii) wherein the at least one liquid is selected from the group consisting of aqueous solutions and organic solutions;
   (b) a second mixing unit adapted to receive the cementitious wellbore fluid and mix the cementitious wellbore fluid with adjustment material, thereby producing an adjusted cementitious wellbore fluid,
   (c) an adjustment tank configured to supply the adjustment material to the second mixing unit;
      (i) wherein the adjustment material is selected from the group consisting of drill cuttings, synthesized geopolymer, sourced geopolymer, mine tailings, cements, additives, and combinations thereof, and (d) a pumping unit, fluidly connected to the second mixing unit and a casing of a wellbore, the pumping unit being adapted to pump the adjusted cementitious wellbore fluid into the casing of the wellbore, wherein the adjusted cementitious wellbore fluid is configured to solidify within a wellbore and form a substantially impermeable cementitious barrier sheath.

21. The system of claim 20, wherein the at least one primary material comprises both drill cuttings and geopolymer.

22. The system of claim 20, wherein the liquid comprises water.

23. The system of claim 20, comprising a density checker adapted to check a density of the cementitious wellbore fluid in the first mixing unit.

24. The system of claim 23, comprising a second density checker adapted to check a density of the cementitious wellbore fluid in the second mixing unit.

25. The system of claim 20, wherein the at least one primary material consists of drill cuttings and synthesized geopolymers.

26. The system of claim 20, wherein the at least one primary material consists of drill cuttings, synthesized geopolymers, and mine tailings.

27. The system of claim 20, wherein the adjusted cementitious wellbore fluid is selected from the group consisting of a lead barrier fluid and a tail barrier fluid.

28. The system of claim 20, comprising a primary materials tank adapted to contain the at least one primary material and adapted to supply the at least one primary material to the first mixing unit.

29. The system of claim 20, comprising a secondary materials tank adapted to contain the at least one secondary material and adapted to supply the at least one secondary material to the first mixing unit.

30. The system of claim 20, comprising a liquid tank adapted to contain the at least one liquid and adapted to supply the at least one liquid to the first mixing unit.

* * * * *